(12) United States Patent
Pan et al.

(10) Patent No.: US 9,887,629 B2
(45) Date of Patent: Feb. 6, 2018

(54) PULSATING CURRENT RIPPLE CANCELLING CIRCUIT AND POWER CONVERTING SYSTEM USING THE SAME

(71) Applicant: National Tsing Hua University, Hsinchu (TW)

(72) Inventors: Ching-Tsai Pan, Hsinchu (TW); Ming-Chieh Cheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 87 days.

(21) Appl. No.: 14/679,116

(22) Filed: Apr. 6, 2015

(65) Prior Publication Data

US 2015/0326105 A1    Nov. 12, 2015

(30) Foreign Application Priority Data

May 6, 2014    (TW) .............................. 103116028 A

(51) Int. Cl.
  *H02M 3/335* (2006.01)
  *H02M 1/14* (2006.01)
  *H02M 3/155* (2006.01)
  *H02M 1/34* (2007.01)

(52) U.S. Cl.
  CPC ............. *H02M 3/335* (2013.01); *H02M 1/14* (2013.01); *H02M 1/143* (2013.01); *H02M 3/155* (2013.01); *H02M 3/33507* (2013.01); *H02M 2001/346* (2013.01); *Y02B 70/1491* (2013.01)

(58) Field of Classification Search
  CPC .. H02M 1/14; H02M 1/143; H02M 2001/346; H02M 3/155; H02M 3/335; H02M 3/33507; Y02B 70/1491
  See application file for complete search history.

(56) References Cited

U.S. PATENT DOCUMENTS

| | | | | |
|---|---|---|---|---|
| 7,206,417 | B2* | 4/2007 | Nathan | H04R 5/04 340/12.33 |
| 8,693,222 | B2* | 4/2014 | Yonezawa | H02M 1/34 363/21.12 |
| 2005/0226008 | A1* | 10/2005 | Harada | H02M 3/3353 363/15 |
| 2008/0101099 | A1* | 5/2008 | Jacobs | H02M 7/06 363/47 |
| 2009/0290383 | A1* | 11/2009 | Zhou | H02M 3/337 363/16 |

(Continued)

*Primary Examiner* — Fred E Finch, III
*Assistant Examiner* — Demetries A Gibson
(74) *Attorney, Agent, or Firm* — patenttm.us

(57) ABSTRACT

The present invention relates to a pulsating current ripple cancelling circuit and a power converting system using the same cancelling circuit. The pulsating current ripple cancelling circuit includes a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the secondary winding side of the first transformer; a first equivalent capacitor combination electrically coupled with the primary winding side of the first transformer; and a second equivalent capacitor combination electrically coupled with the secondary winding side of the second transformer.

15 Claims, 16 Drawing Sheets

(56) References Cited

U.S. PATENT DOCUMENTS

| | | | |
|---|---|---|---|
| 2012/0262953 A1* | 10/2012 | Jungreis | H02M 3/285 363/17 |
| 2014/0056032 A1* | 2/2014 | Pan | H02M 3/33569 363/16 |
| 2014/0070885 A1* | 3/2014 | Frium | H03F 3/217 330/251 |
| 2014/0204620 A1* | 7/2014 | Skinner | H02M 3/33507 363/21.01 |
| 2015/0055379 A1* | 2/2015 | Fang | H02M 1/34 363/21.17 |
| 2015/0109831 A1* | 4/2015 | Ohashi | H02M 3/33507 363/21.06 |
| 2015/0124500 A1* | 5/2015 | Li | H02M 3/335 363/52 |
| 2015/0280588 A1* | 10/2015 | Marrero | H02M 3/33546 363/21.04 |

* cited by examiner

PULSATING CURRENT RIPPLE CANCELLING CIRCUIT AND POWER CONVERTING SYSTEM USING THE SAME

FIELD

The present invention relates to a pulsating current ripple cancelling circuit, in particular to a pulsating current ripple cancelling circuit for cancelling a pulsating current ripple in a switching-type power converter having a pulsating current with ripples.

BACKGROUND

Usually a switching-type power converter owns multiple advantages, such as high efficiency, high power density and small device volume, and therefore it has been widely applied to computer related products, communication related products, automatic control related products, industrial products and so on. However, the switching-type power converter usually adopts an active switcher or a turn-on or turn-off switching strategy, which may inherently result in the existence of the high frequency electric current ripples. For an actual and real application, it further causes several technical issues, such as the electromagnetic interference (EMI), the unstable voltage output, the raise of transient response, the relatively lower converting efficiency and the shortened component life.

In convention, the simplest way to cancel or eliminate continuous high frequency electric current ripples is to increase the switching frequency or to rise up the filter inductance or the capacitance, so as to minimize or alleviate the affection thereof. However, the increasing of the switching frequency will cause relatively lower conversion efficiency, the rise of the filter inductance or the capacitance will cause relatively larger device volume which is helpless to enhance the overall power density for a power converter. On the other hand, for a power converter having pulsating current ripples at an input end or an output end, such as a Flyback converter, a Forward converter, a Buckboost converter, a Buck converter, a Boost converter, a Sepic converter or a Zeta converter, the simplest way to cancel the pulsating current ripples is to electrically couple with an electrolytic capacitor having a relatively larger capacitance in parallel either at the input end or at the output end, but it increases the overall device volume and shortens the component life for a power converter.

In the state of the art, a current ripple cancelling technology is typically categorized into two types including a passive type scheme and an active type scheme. The passive type current ripple cancelling circuit is a filter circuit which mainly consists of passive components, such as inductor and capacitor, and requires none of additional/external control signals. In the prior arts, the schemes focused on using means of coupling inductor and ripple filter are all categorized as the passive type current ripple cancelling technology. A coupling inductor is often used in a non-isolated Cuk converter. The principal operating concept thereof is to first organize a coupling inductor and then to achieve zero current ripples at the input end and the output end by adjusting the inductive value and the coupling coefficients. Nevertheless, the scheme is unsuitable for a basic Boost, Buck and Buckboost converter which just contains a single inductor. As aforementioned, the current ripple cancelling is achieved by adjusting the coupling coefficients which requires a very sophisticated manufacturing technology which technology is hardly available. In addition, the energy leakage resulted from the winding of the coupling inductor also significantly affects the converting efficiency. Another way regarding the current ripple filter is to use a cancelling circuit consists of both coupling inductor and filtering capacitor. Although the scheme is capable of being applied to a basic converter containing a single inductor, the performance thereof is also dependent upon the coupling coefficients as mentioned above.

As compared with the above-mentioned passive current ripple cancelling technologies, an active current ripple cancelling circuit consists of multiple passive components and active power switches, which additionally requires an external control signal to control the circuit. In the prior literatures in the related technical field, the most common active current ripple cancelling circuit is an interleaving control type parallel power converter. Although the switching strategy based on the interleaving control owns multiple advantages, such as effectively reducing current ripples and sharing input or output currents of a converter, it also bears quite a few limitations and shortages. Except requiring sophisticated control loop layout and costing high price, the scheme is inapplicable to cancel the current ripple in a single-phase converter and to cancel the pulsating current ripple. In addition, the current ripple cancelling performance the interleaving control type current ripple cancelling technology can achieve is totally limited to the variation of switching duty cycle. As if the duty cycle is deviated from the designed operating range, the current ripples generated in the converter fail to be well cancelled.

For the above-mentioned disadvantages, there further raises a passive current ripple cancelling technology. The technology requires none of active power switches which does not increase the costs resulted from the arrangement of active power switches and the related driving circuit. In addition, the current ripple cancelling performance the passive current ripple cancelling technology can achieve is not limited to the output voltage, the output voltage specification or the switching duty cycle originally set in the converter, which causes the technology being applicable to cancel the current ripple in a single-phase converter. Nevertheless, such a passive current ripple cancelling technology is particularly dedicated to cancel the continuous current ripple, and is inapplicable to a switching type power converter having a pulsating current ripple input or output.

There is a need to solve the above deficiencies/issues.

SUMMARY

Accordingly, the present invention is to provide a pulsating current ripple cancelling circuit which is capable of improving the defects and disadvantages existing in the state of the art. The cancelling circuit can be used for cancelling the current ripples, in particular high frequency, existing in a switching type power converter occurring current ripples at an input end or an output end thereof, so as to cause the converter to have zero input current ripples or zero output current ripples.

The present invention further provides a pulsating current ripple cancelling circuit. The cancelling circuit requires none of external active type switches. Therefore, the cancelling circuit does not increase the cost to arrange the active switches and dispose the corresponding driving circuit thereof in the converter using the cancelling circuit. In addition, the cancelling circuit is capable of replacing the conventional scheme that the switching type power converter eliminates the pulsating current ripples by additionally using and adding electrolytic capacitors, and is effectively helpful to extend the overall component and device lifespan.

The present invention further provides a pulsating current ripple cancelling circuit which requires none of additional/external control and feedback circuit or unit, and it therefore brings none of affections to the stability for the original power converter. In addition, the effect of cancelling current ripple is not limited to the output voltage, the output voltage specification or the switching duty cycle originally set in the converter. Thus, the circuit is totally compatible with the current circuit layout used in the power converter or can be easily integrated into it. It is anticipated that the present cancelling circuit is widely popular to be used in/integrated into the converter to eliminate the annoying current ripples at both input and output ends.

The present invention provides a pulsating current ripple cancelling circuit. The cancelling circuit totally differs from the conventional interleaving control type parallel power converter. The cancelling circuit can be applied to the single-phase converter. The cancelling circuit requires relatively lesser energy storage capacity for both leakage inductor and magnetizing inductor, which is correspondingly capable of effectively reducing the energy losses resulted from the winding and current ripples, and the power converter using the present cancelling circuit can also benefit therefrom.

The present invention mainly provides a pulsating current ripple cancelling circuit. The circuit includes a first transformer having a primary winding side and a secondary winding side, a second transformer having a primary winding side and a secondary winding side, a first diode, a first equivalent capacitor and a second equivalent capacitor. The primary winding side of the first transformer is coupled with the primary winding side of the second transformer in series. The first diode is coupled with the secondary winding side of the first transformer in series. The first equivalent capacitor is coupled with the primary winding side of the first transformer in series. The second equivalent capacitor is coupled with the secondary winding side of the second transformer.

The present invention further provides a power converting system based on the above-mentioned pulsating current ripple cancelling circuit. The system includes a power converter and the pulsating current ripple cancelling circuit which converter and circuit are electrically connected with each other in parallel. The cancelling circuit further includes a first transformer having a primary winding side and a secondary winding side, a second transformer having a primary winding side and a secondary winding side, a first diode, a first equivalent capacitor and a second equivalent capacitor. The primary winding side of the first transformer is coupled with the primary winding side of the second transformer in series. The first diode is coupled with the secondary winding side of the first transformer in series. The first equivalent capacitor is coupled with the primary winding side of the first transformer in series. The second equivalent capacitor is coupled with the secondary winding side of the second transformer.

The present invention provides a pulsating current ripple cancelling circuit. The pulsating current ripple cancelling circuit includes: a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the secondary winding side of the first transformer; a first equivalent capacitor combination electrically coupled with the primary winding side of the first transformer; and a second equivalent capacitor combination electrically coupled with the secondary winding side of the second transformer.

The present invention provides a pulsating current ripple cancelling circuit. The pulsating current ripple cancelling circuit includes: a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the loop coupled with the secondary winding side of the first transformer; a first equivalent capacitor combination electrically coupled with the loop coupled with the primary winding side of the first transformer in series; and a second equivalent capacitor combination electrically coupled with the loop coupled with the secondary winding side of the second transformer in series.

The present invention further provides a power converting system having a pulsating current ripple cancelling circuit. The power converting system includes: a converter; and a pulsating current ripple cancelling circuit electrically coupled with the converter. The pulsating current ripple cancelling circuit further includes: a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the secondary winding side of the first transformer; a first equivalent capacitor combination electrically coupled with the primary winding side of the first transformer; and a second equivalent capacitor combination electrically coupled with the secondary winding side of the second transformer.

The first transformer is preferably a current ripple cancelling transformer and the second transformer is preferably a high frequency transformer. The converter is preferably a switching type power converter. The primary winding sides of both the current ripple cancelling and the high frequency transformers are electrically coupled in series with appropriate DC-isolated capacitor (a.k.a. the first and second equivalent capacitors), so as to provide a mirror current containing high frequency pulsating ripples. The mirror current has its own properties, such as a charging current waveform, a discharging current waveform, a charging boost rate (a charging slope) or a discharging boost rate (a discharging slope), which properties are exactly opposite to those of the original current containing high frequency pulsating ripples in the original power converter, so that the final output synthesized current composed of the mirror current and the original current has zero current ripples.

The DC-isolated capacitor is mainly used for preventing DC current from flowing into the current ripple cancelling circuit, to cause the circuit to only include AC-based current ripple. Thus the current ripple cancelling circuit consumes relatively less energy losses and requires none of additional/external active power switches, but can still achieve the effect of cancelling ripples.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1A:
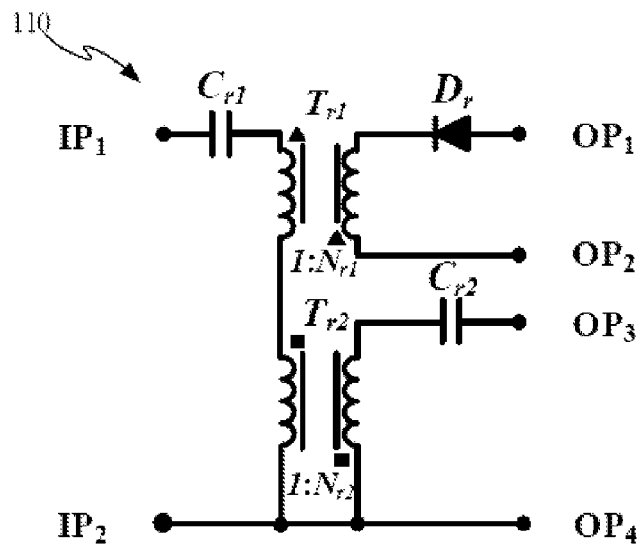
FIG. 1(A) shows a schematic diagram illustrating an electric circuit layout for cancelling pulsating current ripples in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Please refer to FIG. 1(A), which shows a schematic diagram illustrating the pulsating current ripple cancelling circuit in accordance with the invention. The pulsating current ripple cancelling circuit 110 is composed of a ripple cancelling transformer Tr1, a high frequency transformer Tr2, a ripple cancelling diode Dr and two direct current (DC) blocking capacitors Cr1, Cr2, wherein the turns ratio of the ripple cancelling transformer Tr1 is 1:Nr1, the turns ratio of the high frequency transformer Tr2 is 1:Nr2, the primary winding side of Tr1 mutually electrically couples to the primary winding side of Tr2 and then electrically couples a DC blocking capacitor Cr1; the mutually electrically coupled primary winding side of Tr1 and primary winding side of Tr2, the first input end IP1 and the second input end IP2 forms a first serial circuit, and the direct current (DC) blocking capacitor Cr1 electrically couples to the first serial circuit. In this embodiment, the direct current (DC) blocking capacitor Cr1 electrically couples to the first serial circuit is close to the side of first input end IP1, but it can also electrically couples to the side close to the current input end IP2.

The secondary winding side of the ripple cancelling transformer Tr1 has to electrically couple to the ripple cancelling diode Dr; the electrically coupled secondary winding side of the ripple cancelling transformer Tr1 and the ripple cancelling diode Dr, the first output end OP1 and the second output OP2 forms a second serial circuit. In this embodiment, the ripple cancelling diode Dr electrically couples to the side close to the first output end OP1, but it can also electrically couples to the side close to the second output OP2.

The secondary winding side of the high frequency transformer Tr2 has to electrically couple to another direct current blocking capacitor Cr2; the electrically coupled secondary winding side of the high frequency transformer Tr2 and the direct current blocking capacitor Cr2, the third output end OP3 and the forth output OP4 form the third serial circuit. In this embodiment, the direct current blocking capacitor Cr2 is electrically coupled to the side close to the third output end OP3, but it can also be electrically coupled to the side close to the forth output OP4. Combining the first serial circuit, the second serial circuit and the third serial circuit forms the pulsating current ripple cancelling circuit 110 in accordance with the present invention.

Figure 1B:
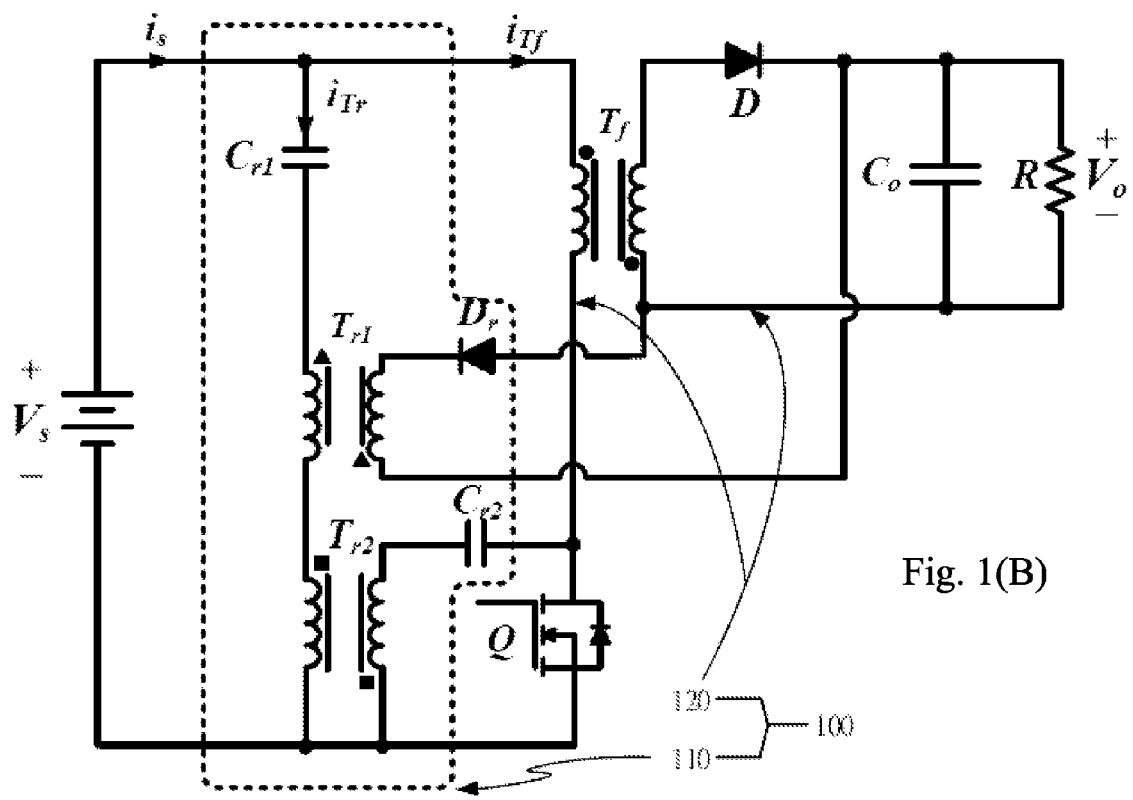
FIG. 1(B) shows a schematic diagram illustrating an electric circuit layout for a switching type Flyback power converter having a zero input current ripple due to the addition of the pulsating current ripple cancelling circuit in accordance with the present invention.

Please refer to FIG. 1(B), which is the schematic diagram illustrating the circuit layout of the pulsating current ripple cancelling circuit in accordance with the present invention which is applied to the Flyback switch mode power converter to eliminate pulsating current ripple. Electrically coupling the primary winding side of the ripple cancelling transformer Tr1 and the primary winding side of the high frequency transformer Tr2, respectively electrically couples a direct current blocking capacitor Cr1, Cr2 to the primary winding side of the ripple cancelling transformer Tr1 and the secondary winding side of the high frequency transformer Tr2, and respectively couples to the two ends of the Flyback transformer Tf, wherein the secondary winding side of the ripple cancelling transformer Tr1 is electrically coupled to the ripple cancelling diode Dr before it is coupled to the output end of the Flyback switch mode power converter, and then complete the electrically coupling of the pulsating current ripple cancelling circuit and the Flyback switch mode power converter.

Figure 2:
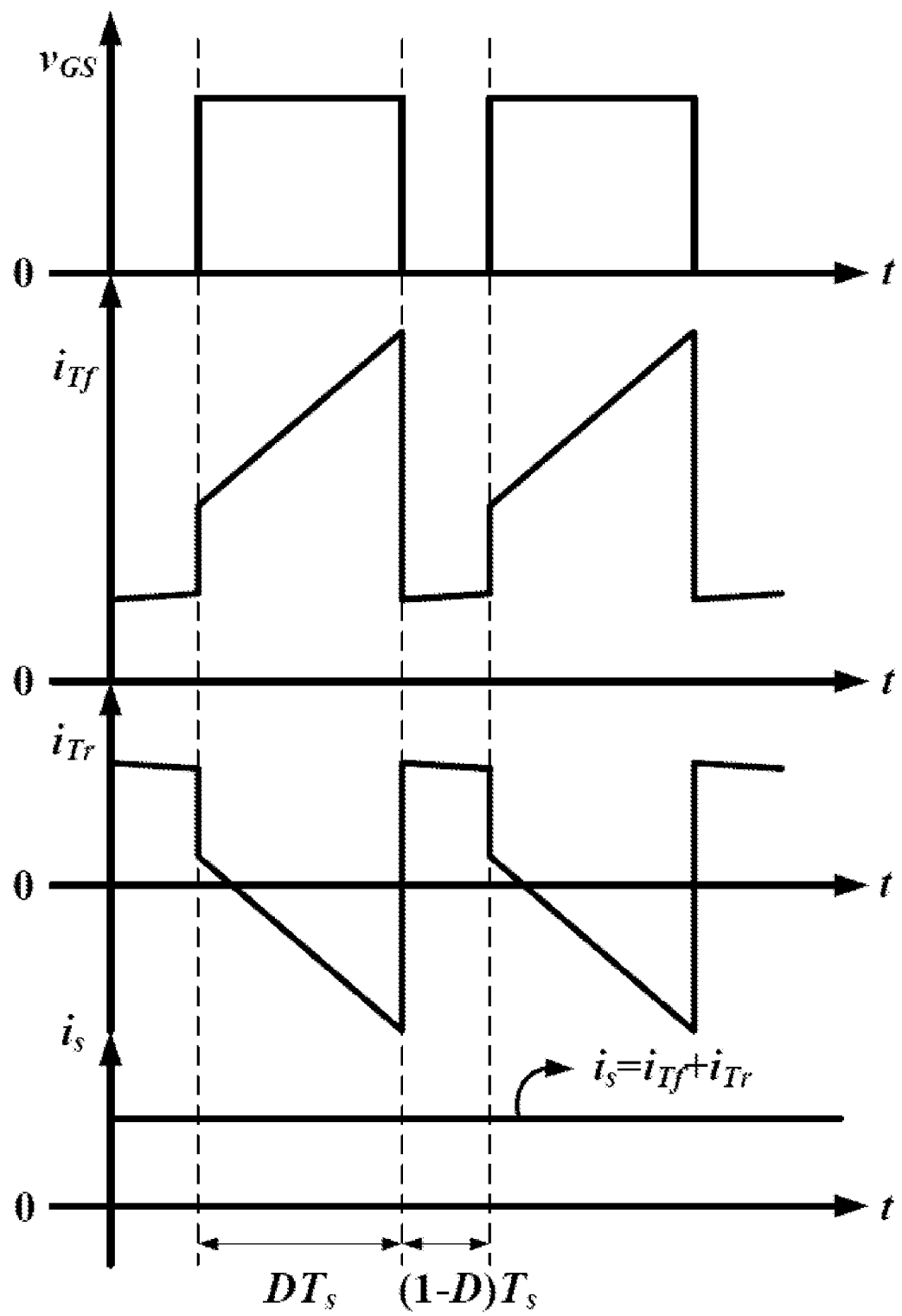
FIG. 2 shows a schematic diagram illustrating multiple electric current waveforms, in the embodiment as shown in FIG. 1(B), a driving voltage vGS of the active switch, an input current iTf of the Flyback transformer, a pulsating current ripple cancelling current iTr and a synthesized current is with zero input current ripple after compensated.

Please refer to FIG. 1(B) and FIG. 2, the FIG. 2 shows a schematic diagram illustrating waveforms of the driving voltage $v_{GS}$ of the active switch of the converter, the input current iTf of the Flyback transformer, the pulsating current ripple cancelling current iTr and the compensated synthesized zero ripple input current is in the FIG. 1(B).

It is observed from FIG. 2 that the waveform of the pulsating current ripple cancelling current iTr is contrary to the constituent of the waveform of the input current iTf of the Flyback transformer, for the reason that it can be used to compensate the input pulsating current ripple of the Flyback transformer. When the active switch of the original Flyback transformer is turned on and the voltage across the primary winding side of the Flyback transformer Tf is a fixed positive voltage, the current iTf flowed into the Flyback transformer is linearly increasing; at this moment the voltage across the primary winding side of the ripple cancelling transformer Tr1 is a fixed negative voltage, so that the pulsating current ripple cancelling current iTr is linearly decreased. When the active switch of the original Flyback transformer turns off, the slope of the current iTf flowed into the Flyback transformer and the slope of the pulsating current ripple cancelling current iTr can compensate for each other.

As the waveform shown in FIG. 2, according to the principle aforementioned, when the slope of current iTf is contrary to the slope of current iTr, the pulsating current ripple cancelling current iTr can fully compensate for the pulsating current ripple of the current iTf of the original transformer, and the compensated synthesized input current is will be a pure direct current with zero ripple. In accordance with aforementioned principle, the present invention proposes a pulsating current ripple cancelling circuit applied to a switch mode power converter with pulse current ripple.

In order to facilitate further illustrate, the following draws out the equivalent circuit in accordance with the Flyback switch mode power converter with zero input current ripple as the active switch is turned on (or called operating mode I) and as the active switch is turned off (or called operating mode II) in FIG. 1(B), and also considering the equivalent leakage inductor and the equivalent magnetizing inductor of the transformer.

Figure 3A:
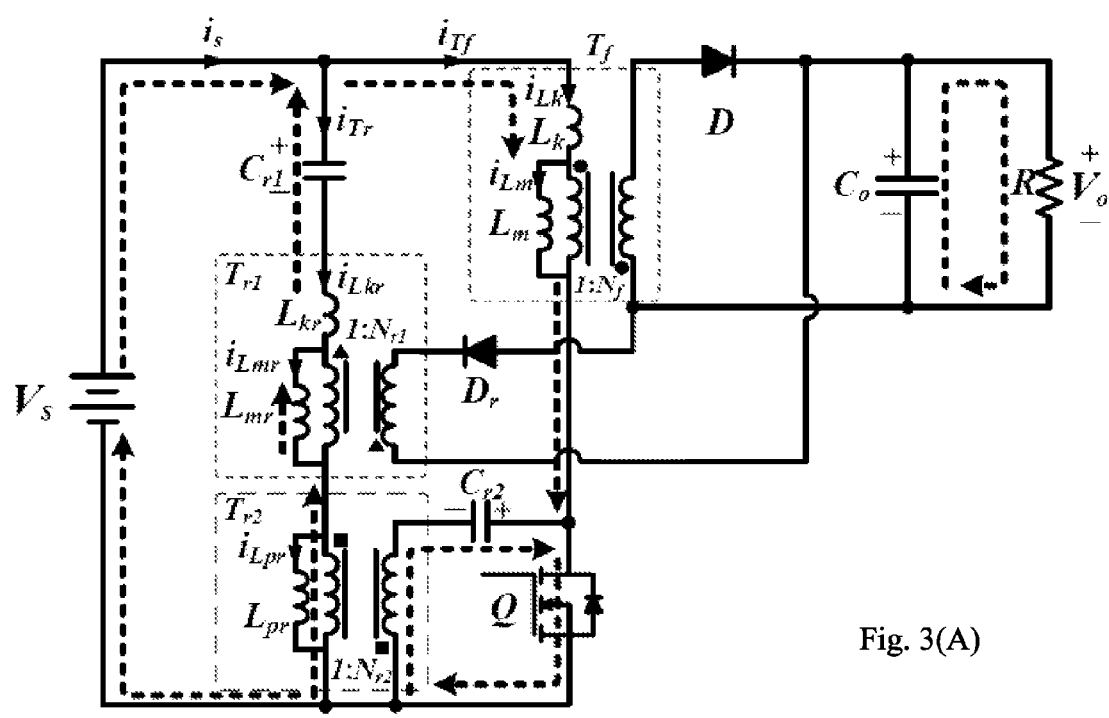
FIG. 3(A) shows a schematic diagram illustrating an equivalent circuit for the state the active switch is in a cut-in state (the operating mode I) in the converter, in the embodiment as shown in FIG. 1(B).
Figure 3B:
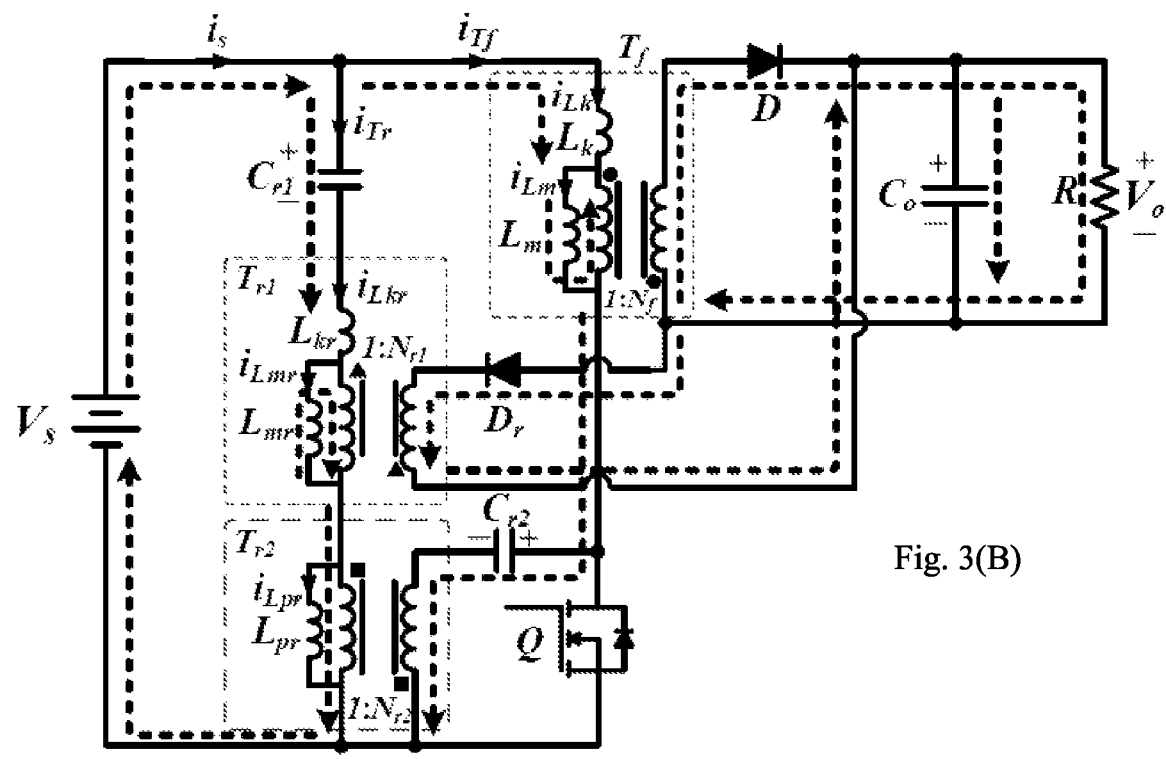
FIG. 3(B) shows a schematic diagram illustrating an equivalent circuit for the state the active switch is in a cut-off state (the operating mode II) in the converter, in the embodiment as shown in FIG. 1(B).

Please refer to FIG. 3(A) and FIG. 3(B), which show the equivalent circuit in accordance with the converter in FIG. 1(B) in operating mode I and operating mode II. For the sake of facilitating a clear illustration of the operating principle of the circuit, the following assumes the active switch and the diode components are ideal, and assumes the loading is pure resistance R. In which Vs is the input voltage of the converter; Vo is the output voltage of the converter; Lk is the equivalent leakage inductor of the primary winding side of the Flyback transformer Tf; Lm is the equivalent magnetizing inductor of the primary winding side of the Flyback transformer Tf; Lkr is the equivalent leakage inductor of the primary winding side of the ripple cancelling transformer Tr1; Lmr is the equivalent magnetizing inductor of the primary winding side of the ripple cancelling transformer Tr1; Lpr is the equivalent magnetizing inductor of the primary winding side of the high frequency transformer Tr2. The principal operating concept thereof is described as follows.

Operating Mode I

Please refer to FIG. 3(A). The circuit in FIG. 3(A) is in a state that the active switch Q in the converter is cut in, and the diode D and the ripple cancelling diode Dr are reverse-biased cut off. In the meantime, the input voltage Vs provides and stores energy into the leakage inductor Lk and magnetizing inductor Lm. The voltage across the leakage inductor Lk and magnetizing inductor Lm is positive. The current iTf flowing through the Flyback transformer Tf is equal to the current iLk flowing through the leakage inductor Lk, and is also equal to the current iLm flowing through the leakage inductor Lm. The current iTf increases with a positive slope. On the other hand, the voltage $v_{cr2}$ across the secondary winding side DC isolated capacitor Cr2 is coupled to the first winding side through the high frequency transformer Tr2. Therefore, the voltage across the leakage inductor Lk and magnetizing inductor Lm is a negative voltage $(v_{Lkr}+v_{Lmr}=Vs-v_{Cr1}-(1/N_{r2})v_{Cr2})$. The pulsating current ripple cancelling current iTr is equal to the current iLkr flowing through the leakage inductor Lkr, and is also equal to the current iLmr flowing through the magnetizing inductor Lmr. The current iTr decreases with a negative slope. Thus the current iTr can be used for compensating the ripple component in current iTf. According to Kirchhoff's voltage law (KVL), a state equations are listed as follows.

$$L_k \frac{di_{Lk}}{dt} = \left(\frac{L_k}{L_k + L_m}\right) V_s \quad (1)$$

$$L_m \frac{di_{Lm}}{dt} = \left(\frac{L_m}{L_k + L_m}\right) V_s \quad (2)$$

$$L_{pr} \frac{di_{Lpr}}{dt} = \frac{1}{N_{r2}} v_{Cr2} \quad (3)$$

$$L_{kr} \frac{di_{Lkr}}{dt} = \left(\frac{L_{kr}}{L_{kr} + L_{mr}}\right)\left(V_s - v_{Cr1} - \frac{1}{N_{r2}} v_{Cr2}\right) \quad (4)$$

$$L_{mr} \frac{di_{Lmr}}{dt} = \left(\frac{L_{mr}}{L_{kr} + L_{mr}}\right)\left(V_s - v_{Cr1} - \frac{1}{N_{r2}} v_{Cr2}\right) \quad (5)$$

Operating Mode II

Please refer to FIG. 3(B). The active switch Q in the converter is cut off, and the diode D and the ripple cancelling diode Dr are forward-biased cut in. In the meantime, the voltage across the magnetizing inductor Lm is a negative voltage ($v_{Lm}$=(1/Nf)Vo). The current iLm decreases with a negative slope. The magnetizing inductor then transmits the power energy to the payload end. The voltage across the magnetizing inductor Lmr is a positive voltage ($v_{Lmr}$=−(1/Nr1)Vo). The current iLm increases with a positive slope. The magnetizing inductor Lmr also transmits the power energy to the payload end. In the meantime, the current iTf flowing through the Flyback transformer Tf is equivalent to the current iLk flowing through leakage inductor Lk, and the pulsating current ripple cancelling current iTr is equivalent to the current iLkr flowing through the leakage inductor Lkr. The slope of the current iTr and the slope of the current iLk are opposite to each other. Thus the current iTr can be used for compensating the ripple component in current iTf. Through the above-mentioned principle, when the slope of current iTf and the slope of current iTr are opposite to each other in both the operating mode I and the operating mode II, the pulsating current ripple cancelling current iTr can fully compensate the pulsating current ripple component existing in current iTf in the converter. It turns out the input current to be a pure DC current with zero current ripple.

It is worth to notice that, in this operating mode, the power energy stored in the leakage inductor Lk can be released to the secondary winding side DC isolated capacitor Cr2. As compared with the conventional Flyback power converter, the switching voltage spike occurring at the moment while the active switch is cut off can be significantly reduced. Thus the switching type Flyback power converter equipped with the circuit in accordance with the present invention and having a zero input current ripple can selectively utilize an active switch component having a relatively lower voltage rating, and can reduce the conduction and switching losses for the active switch so as to improve the converting efficiency for the converter. According to Kirchhoff's voltage law (KVL), the state equations are further listed as follows.

$$L_m \frac{di_{Lm}}{dt} = -\frac{1}{N_f} v_{Co} \quad (6)$$

$$L_{mr} \frac{di_{Lmr}}{dt} = \frac{1}{N_{r1}} v_{Co} \quad (7)$$

$$L_k \frac{di_{Lk}}{dt} = N_{r2} L_{pr} \frac{di_{Lpr}}{dt} + \frac{1}{N_f} v_{Co} - v_{Cr2} + V_s \quad (8)$$

$$L_{kr} \frac{di_{Lkr}}{dt} = -L_{pr} \frac{di_{Lpr}}{dt} - \frac{1}{N_{r1}} v_{Co} - v_{Cr1} + V_s \quad (9)$$

Voltage Gain of the Converter

According to the equivalent circuit of the operating mode I and operating mode II, it is known that an average output capacitor voltage is equal to the converter output voltage which is shown as follows.

$$V_{Co} = V_o \quad (10)$$

From equations (2), (6) and (10), an equation (11) is further derived, in accordance with an inductor volt-second balance theory in reference with a charging-discharging condition for the magnetizing inductor Lm in a steady-state, as follows.

$$\left(\frac{L_m}{L_k + L_m}\right) V_s D - \frac{1}{N_f} V_o (1 - D) = 0 \quad (11)$$

wherein D is a duty ratio within a switching period of the active switch.

From equation (11), the voltage gain is further derived for the switching type Flyback power converter added with the circuit in accordance with the present invention and having a zero input current ripple, as shown in equation (12). It is obtained from equation (12) that the pulsating current ripple cancelling circuit in accordance with the present invention provides none of affections to the voltage gain of the original converter.

$$\frac{V_o}{V_s} = \left(\frac{L_m}{L_k + L_m}\right)\left(\frac{D}{1 - D}\right) N_f \quad (12)$$

Average Capacitor Voltage in a Steady-State

Usually, since the leakage inductance in the transformer is far less than the magnetizing inductance, which means the leakage inductance Lk is far less than the magnetizing inductance Lm and the leakage inductance Lkr is far less than the magnetizing inductance Lmr, the voltage drop for a leakage inductor can be neglected during deriving an average voltage value of capacitor. From equation (12), it is known an approximate voltage gain of the switching type Flyback power converter added with the circuit in accordance with the present invention and having a zero input current ripple as follows.

$$\frac{V_o}{V_s} \cong \left(\frac{D}{1 - D}\right) N_f \quad (13)$$

Similarly, the voltage drops of the leakage inductors Lk and Lkr can be neglected. From equations (3) and (8), an equation is further derived, in accordance with an inductor volt-second balance theory in reference with a charging-discharging condition for the magnetizing inductor Lpr in a steady-state, as follows.

$$\frac{D}{N_{r2}} V_{Cr2} + \left(\frac{1-D}{N_{r2}}\right)\left(-\frac{1}{N_f} V_o + V_{Cr2} - V_s\right) = 0 \quad (14)$$

By substituting equation (13) into equation (14), an equation is obtained as follows.

$$\frac{D}{N_{r2}}V_{Cr2} + \left(\frac{1-D}{N_{r2}}\right)\left(-\left(\frac{D}{1-D}\right)V_s + V_{Cr2} - V_s\right) = 0 \quad (15)$$

From equation (15), it is further obtained the average capacitor voltage of the secondary winding side DC isolated capacitor Cr2 in a steady-state as follows.

$$V_{Cr2} = V_s \quad (16)$$

Similarly, by neglecting the voltage drops of leakage inductors Lk and Lkr, from equations (5) and (7), an equation is further derived, in accordance with an inductor volt-second balance theory in reference with a charging-discharging condition for the magnetizing inductor Lmr in a steady-state, as follows.

$$\left(V_s - v_{Cr1} - \frac{1}{N_{r2}}v_{Cr2}\right)D + \frac{1}{N_{r1}}V_o(1-D) = 0 \quad (17)$$

By substituting equations (13) and (16) into equation (17), an equation is obtained as follows.

$$\left(V_s - v_{cr1} - \frac{1}{N_{r2}}V_s\right)D + \frac{N_f}{N_{r1}}DV_s = 0 \quad (18)$$

From the above equation, it is further obtained the average capacitor voltage of the primary winding side DC isolated capacitor Cr1 in stable state as follows.

$$V_{Cr1} = \left(1 - \frac{1}{N_{r2}} + \frac{N_f}{N_{r1}}\right)V_s \quad (19)$$

Design Conditions for Achieving Zero Input Current Ripple

The input current in the switching type Flyback power converter added with the circuit in accordance with the present invention and having a zero input current ripple is shown as following equation.

$$i_s = i_{Tf} + i_{Tr} = i_{Lk} + i_{Lkr} \quad (20)$$

Assuming the variation rate of current for a power converter after synthesized is zero, an equation (21) is accordingly obtained as follows.

$$\frac{di_s}{dt} = \frac{di_{Tf}}{dt} + \frac{di_{Tr}}{dt} = \frac{di_{Lk}}{dt} + \frac{di_{Lkr}}{dt} = 0 \quad (21)$$

First, when the power converter is in the operating mode I, the relationship between leakage inductor and magnetizing inductor is shown as equations (22) and (23) as follows.

$$i_{Tf} = i_{Lk} = i_{Lm} \quad (22)$$

$$i_{Tr} = i_{Lkr} = i_{Lmr} \quad (23)$$

From equations (22) and (23), further in reference with the equivalent circuit for the switching type Flyback power converter added with the circuit in accordance with the present invention and having a zero input current ripple in the operating mode I, a state equation is listed as follows.

$$(L_k + L_m)\frac{di_{Lk}}{dt} = (L_k + L_m)\frac{di_{Lm}}{dt} = V_s \quad (24)$$

$$(L_{kr} + L_{mr})\frac{di_{Lkr}}{dt} = (L_{kr} + L_{mr})\frac{di_{Lmr}}{dt} = V_s - v_{Cr1} - \frac{1}{N_{r2}}v_{Cr2} \quad (25)$$

It is assumed that the respective voltage values of capacitor in the converter operated under the operating modes I and II are all kept in a fixed value. By substituting the average capacitor voltage obtained from equations (16) and (19) into equation (25), it is obtained as follows.

$$(L_{kr} + L_{mr})\frac{di_{Lkr}}{dt} = (L_{kr} + L_{mr})\frac{di_{Lmr}}{dt} = -\frac{N_f}{N_{r1}}V_s \quad (26)$$

The equations (24) and (26) are substituted into the equation (21) to obtain an equation as follows:

$$\frac{di_{Lk}}{dt} + \frac{di_{Lkr}}{dt} = \frac{V_s}{L_k + L_m} - \left(\frac{N_f}{N_{r1}}\right)\frac{V_s}{L_{kr} + L_{mr}} = 0 \quad (27)$$

Equation (27) is rearranged to obtain an equation as follows.

$$L_{kr} + L_{mr} = \left(\frac{N_f}{N_{r1}}\right)(L_k + L_m) \quad (28)$$

Next, from equations (5), (7) and (10), an equation (29) is further listed, in accordance with an inductor volt-second balance theory in reference with a charging-discharging condition for the magnetizing inductor Lmr in a steady-state, as follows.

$$\left(\frac{L_{mr}}{L_{kr} + L_{mr}}\right)\left(V_s - V_{Cr1} - \frac{1}{N_{r2}}V_{Cr2}\right)D + \frac{1}{N_{r1}}V_o(1-D) = 0 \quad (29)$$

The equations (12), (16) and (19) are substituted into the above equation to obtain an equation as follows.

$$\left(\frac{L_{mr}}{L_{kr} + L_{mr}}\right)\left(-\frac{N_f}{N_{r1}}\right)V_sD + \left(\frac{L_m}{L_k + L_m}\right)\left(\frac{N_f}{N_{r1}}\right)V_sD = 0 \quad (30)$$

The equation (28) is substituted into the equation (30) to obtain an equation as follows.

$$-\left(\frac{L_{mr}}{L_k + L_m}\right) + \left(\frac{L_m}{L_k + L_m}\right)\left(\frac{N_f}{N_{r1}}\right) = 0 \quad (31)$$

From the equations (31) and (28), an inductance-related equation is obtained, when the converter is operated in the operating mode I if the input current ripple is zero, as follows.

$$L_{mr} = \left(\frac{N_f}{N_{r1}}\right)L_m \quad (32)$$

$$L_{kr} = \left(\frac{N_f}{N_{r1}}\right)L_k \quad (33)$$

On the other hand, when the converter is operated in the operating mode II, by the same assumption that all voltage values of capacitor are kept in a fixed value, the average voltage value of capacitor obtained from equations (16) and (19) are substituted into the respective state equations as listed in equations (8) and (9) to obtain equations as follows.

$$L_k \frac{di_{Lk}}{dt} = N_{r2} v_{Lpr} + \frac{1}{N_f} V_o \quad (34)$$

$$L_{kr} \frac{di_{Lkr}}{dt} = -v_{Lpr} - \frac{1}{N_{r1}} V_o + \left(\frac{1}{N_{r2}} - \frac{N_f}{N_{r1}}\right) V_s \quad (35)$$

Also assuming that the variation rate of input current for a power converter after synthesized is zero, the equations (34) and (35) can be substituted into the equation (21) to obtain an equation as follows.

$$\frac{di_{Lk}}{dt} + \frac{di_{Lkr}}{dt} = \\ \frac{1}{L_k}\left(N_{r2} v_{Lpr} + \frac{1}{N_f} V_o\right) + \frac{1}{L_{kr}}\left(-v_{Lpr} - \frac{1}{N_{r1}} V_o + \left(\frac{1}{N_{r2}} - \frac{N_f}{N_{r1}}\right) V_s\right) = 0 \quad (36)$$

The relationship equation for the leakage inductors Lk and Lkr obtained from the equation (33) is substituted into the equation (36) to obtain an equation as follows.

$$\frac{1}{L_k}\left(N_{r2} v_{Lpr} + \frac{1}{N_f} V_o\right) + \\ \frac{1}{L_k}\left(-\left(\frac{N_{r1}}{N_f}\right)v_{Lpr} - \frac{1}{N_f} V_o + \left(\frac{N_{r1}}{N_f}\right)\left(\frac{1}{N_{r2}} - \frac{N_f}{N_{r1}}\right) V_s\right) = 0 \quad (37)$$

The above equation is rearranged to obtain en equation as follows.

$$\left(N_{r2} - \frac{N_{r1}}{N_f}\right)v_{Lpr} + \left(\frac{N_{r1}}{N_f}\right)\left(\frac{1}{N_{r2}} - \frac{N_f}{N_{r1}}\right) V_s = 0 \quad (38)$$

From equation (38), a relationship equation representing turns ratios between transformers is further derived as shown in the following equation.

$$N_{r2} = \frac{N_{r1}}{N_f} \quad (39)$$

From the equations (16), (19) and (36), the average capacitor voltages of the power converter under the design conditions of zero input current ripple is further obtained as follow.

$$V_{Cr1} = \left(1 - \frac{1}{N_{r2}} + \frac{N_f}{N_{r1}}\right)V_s = V_s \quad (40)$$

$$V_{Cr2} = V_s \quad (41)$$

To summarize the aforementioned derivations, the design conditions for a power converter with zero input current ripple can be listed as follows.

$$L_{mr} = \left(\frac{N_f}{N_{r1}}\right)L_m \quad (42)$$

$$L_{kr} = \left(\frac{N_f}{N_{r1}}\right)L_k \quad (43)$$

$$N_{r2} = \frac{N_{r1}}{N_f} \quad (44)$$

According to the above-mentioned derivations, one can design the equivalent leakage inductance and the equivalent magnetizing inductance of the ripple cancelling transformer Tr1 and the respective winding ratios of the ripple cancelling transformer Tr1 and the high frequency transformer Tr2, used in the switching type Flyback power converter added with the circuit in accordance with the present invention and having a zero input current ripple, in reference with the equations (42) to (44), so as to achieve the effect of zero input current ripple. The average capacitor voltage of the respective DC isolated capacitors Cr1 and Cr2 are determined by the equations (40) and (41).

According to the above content, more embodiments further disclosed. Please refer to FIG. 1(B), one of the embodiments that the pulsating current ripple cancelling circuit 110 can be further coupled in parallel to the converter 120 to cancel the pulsating current ripple occurring in the input end of the converter 120, wherein the pulsating current ripple cancelling circuit 110 includes a first transformer Tr1 (that is the ripple cancelling transformer above mentioned), a second transformer Tr2 (that is the high frequency transformer above mentioned), a first diode Dr (that is the ripple cancelling diode above mentioned), a first capacitor Cr1 (that is the direct current blocking capacitor of the primary winding side above mentioned) and a second capacitor Cr2 (that is the direct current blocking capacitor of the secondary winding side above mentioned).

The first capacitor Cr1 and the primary winding side of the second transformer Tr2 abovementioned are electrically coupled to the primary winding side of the first transformer Tr1 respectively, wherein the first capacitor Cr1 is located in between the first input end IP1 and the primary winding side of the first transformer Tr1 of the pulsating current ripple cancelling circuit 110, and the primary winding side of the second transformer Tr2 is located in between the second input end IP2 and the primary winding side of the first transformer Tr1 of the pulsating current ripple cancelling circuit 110. The first serial diode Dr electrically coupled to the secondary winding side of the first transformer Tr1, wherein the first serial diode Dr is located in between the first output end OP1 and the secondary winding side of the first transformer Tr1 of the pulsating current ripple cancelling circuit 110, and the secondary winding side of the first transformer Tr1 is located in between the second output end OP2 and the first serial diode Dr of the pulsating current ripple cancelling circuit 110. The second capacitor Cr2 electrically coupled to the secondary winding side of the second transformer Tr2, wherein the second capacitor Cr2 is located in between the third output end OP3 and the secondary winding side of the second transformer Tr2 of the pulsating current ripple cancelling circuit 110, and the secondary winding side of the second transformer Tr2 is located in between the second capacitor Cr2 and the forth output end OP4 of the pulsating current ripple cancelling circuit 110.

In certain embodiments, the present invention provides a converting system 100, the converting system 100, as shown in FIG. 1(A) and FIG. 1(B), includes a pulsating current ripple cancelling circuit 110 and a converter 120 aforementioned that the pulsating current ripple cancelling circuit 110 coupled with the converter 120 to cancel the pulsating current ripple of the input end or the output end of the converter 120. When the converter 120 aforementioned is a Flyback switching power converter, a Forward switching power converter, a Buckboost switching power converter, a Buck switching power converter, a Zeta switching power converter and one of the combination or another has a pulsating current ripple converter at the input end, the pulsating current ripple cancelling circuit 110 can cancel the pulsating current ripple at the input end of the converter 120; when the converter 120 aforementioned is a Flyback switching power converter, a Buckboost switching power converter, a Boost switching power converter, a Sepic switching power converter and one of the combination or another has a pulsating current ripple converter at the output end, the pulsating current ripple cancelling circuit 110 can cancel the pulsating current ripple at the output end of the converter 120.

A Flyback switching power converter, for example, the converter 120 aforementioned includes a power supply, an active switch Q, a third transformer Tf (that is the Flyback transformer above mentioned), a second diode D and a third capacitor Co, wherein the secondary winding side of the third transformer Tf, the third capacitor Co and a resistor R are coupled with each other. The power supply provides an input end voltage Vs, in which the first input end IP1 couples to the primary winding side of the third transformer Tf and one end of the power supply, and the second input end IP2 couples to another end of the power supply, therefore the power supply is located in between the first input end IP1 and the second input end IP2. The first output end OP1 of the pulsating current ripple cancelling circuit 110 couples to the secondary winding side of the third transformer Tf, so that the first diode Dr is located in between the secondary winding side of the first transformer Tr1 and the secondary winding side of the third transformer Tf. The second output end OP2 coupled to the second diode D, so that the secondary winding side of the first transformer Tr1 is located in between the first diode Dr and the second diode D. The third output end OP3 coupled to the primary winding side of the third transformer Tf and one end of the active switch Q, in which the second capacitor Cr2 is located in between the active switch Q and the secondary winding side of the second transformer Tr2. The forth output end OP4 couples to another end of the active switch Q, so that the secondary winding side of the second transformer Tr2 is located in between the active switch Q and the second capacitor Cr2.

Furthermore, the first capacitor Cr1 and the second capacitor Cr2 can be electrolytic capacitors or non-electrolytic capacitors, and the capacitance of the first capacitor Cr1 and the second capacitor Cr2 may be the same or different. The first capacitor Cr1 is used to block the direct current of the primary winding side of the transformer Tr1, and the second capacitor Cr2 is used to block the direct current of the secondary winding side of the transformer Tr2, wherein the first capacitor Cr1 and the second capacitor Cr2 respectively coupled to one of both ends of the primary winding side of the third transformer Tf.

According to the aforementioned converting system 100, the power supply provides a first current is, wherein the current flowing through the primary winding side of the first transformer Tr1 is a second current iTr (that is the pulsating current ripple cancelling current iTr above mentioned), the current flowing through the primary winding side of the third converter Tf is a third current iTf (that is the input current iTf of the Flyback converter above mentioned), in which the second current iTr and the third current iTf respectively have waveform phases opposite to each other so as to synthesize the first current is as shown in equation (20). The synthesized first current is a direct current as shown in equation (21).

Please refer to FIG. 1(B), FIG. 3(A) and FIG. 2. While the converter 120 is a Flyback switching mode power converter and in operating mode I (which lies in between timeframe DTs), the active switch Q is turned on, and the first diode Dr and the second diode D are reverse-biased. The second current iTr flows through the primary winding side of the first transformer Tr1 to the first capacitor Cr1. In the meanwhile the energy provided by the power supply stores in the magnetizing inductor Lm and the leakage inductor Lk, which are on the primary winding side of the third transformer Tf.

While the converter 120 is a Flyback switching mode power converter and the active switch Q is turned on, within a duty cycle DTs of the switching period, the constituent waveform phases of the ripple of the second current iTr and the third current iTf is respectively opposite to each other, in which the third current iTf is increasing with a positive slope and the second current iTr is decreasing with a negative slope. For the reason that the slope of the second current iTr and the third current iTf compensate for each other to synthesize the first current is, which is a direct current.

Please refer to FIG. 1(B), FIG. 3(B) and FIG. 2. While the converter 120 is a Flyback switching mode power converter and in operating mode II (which lies in between timeframe (1−D)Ts), the active switch Q is turned off, and the first diode Dr and second diode D are forward-biased. The second current iTr flows through the first capacitor Cr1 to the primary winding side of the first transformer Tr1. In the meanwhile, the energy stored in the magnetizing inductor Lm and the leakage inductor Lk releases to the output.

While the converter 120 is a Flyback switching mode power converter and the active switch Q is turned off, within a timeframe (1−D)Ts of the switching period, the constituent waveform phases of the ripple of the second current iTr and the third current iTf is still respectively opposite to each other. The slope of the second current iTr and the third current iTf still compensate for each other to synthesize the first current is, which is a direct current.

According to the aforementioned two modes, while the slope of the second current iTr and the third current iTf are opposite to each other in operating mode I and operating mode II, the second current iTr can completely compensate for the pulsating current ripple of the third current iTf of the converter 120. The compensated synthesized current (the first current is) will be a pure direct current with zero ripples. Moreover, in the operating mode II, the energy stored in the leakage inductor Lk is released to the second capacitor Cr2 on the secondary winding side of second transformer Tr2. As compared with the conventional Flyback switching mode power converter, it can significantly reduce the voltage spike when the active switch Q is turned off. Furthermore, the zero input current ripple Flyback switching mode power converter with the present invention can select an active switch component with lower voltage rating, which reduces the conduction losses of the active switch in order to enhance the efficiency of the converter.

Figure 4:
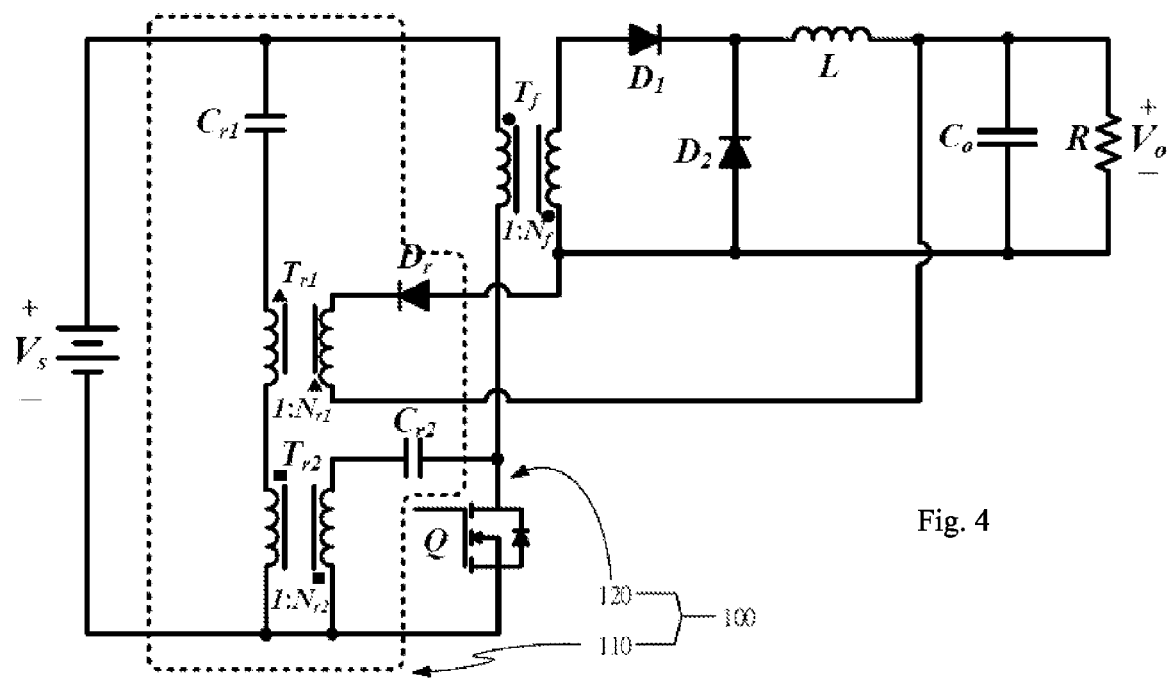
FIG. 4 shows a schematic diagram illustrating an electric circuit layout for a switching type Forward power converter having a zero input current ripple after the addition of the pulsating current ripple cancelling circuit in accordance with the present invention.
Figure 5:
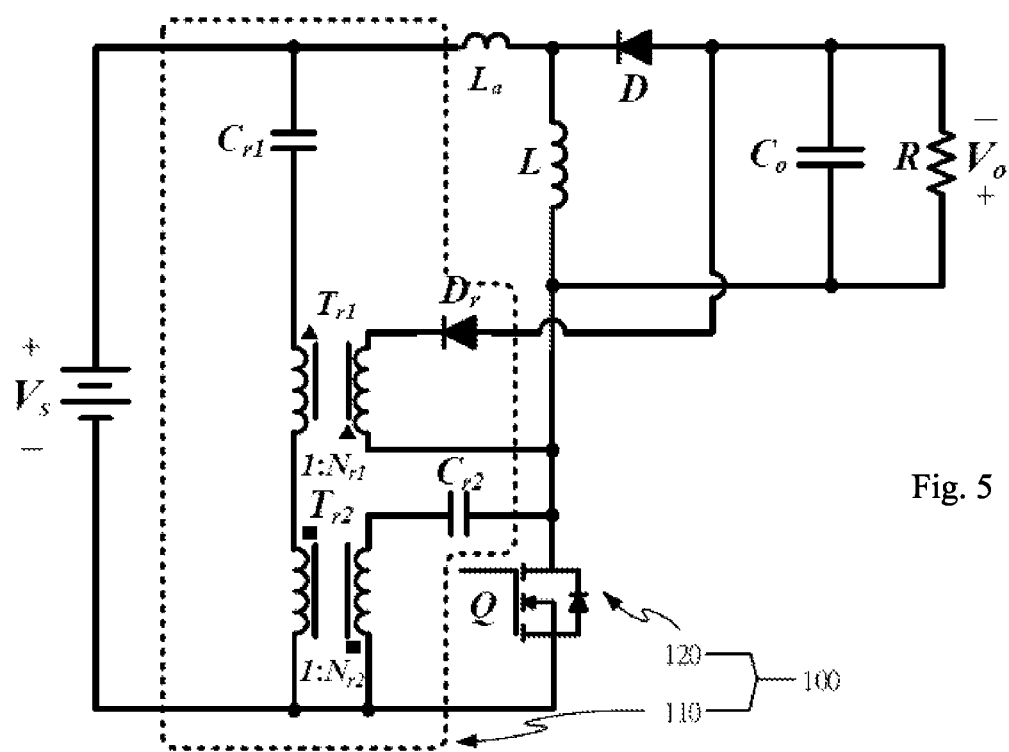
FIG. 5 shows a schematic diagram illustrating an electric circuit layout for a switching type Buckboost power converter having a zero input current ripple owing to the addition of the pulsating current ripple cancelling circuit in accordance with the present invention.
Figure 6:
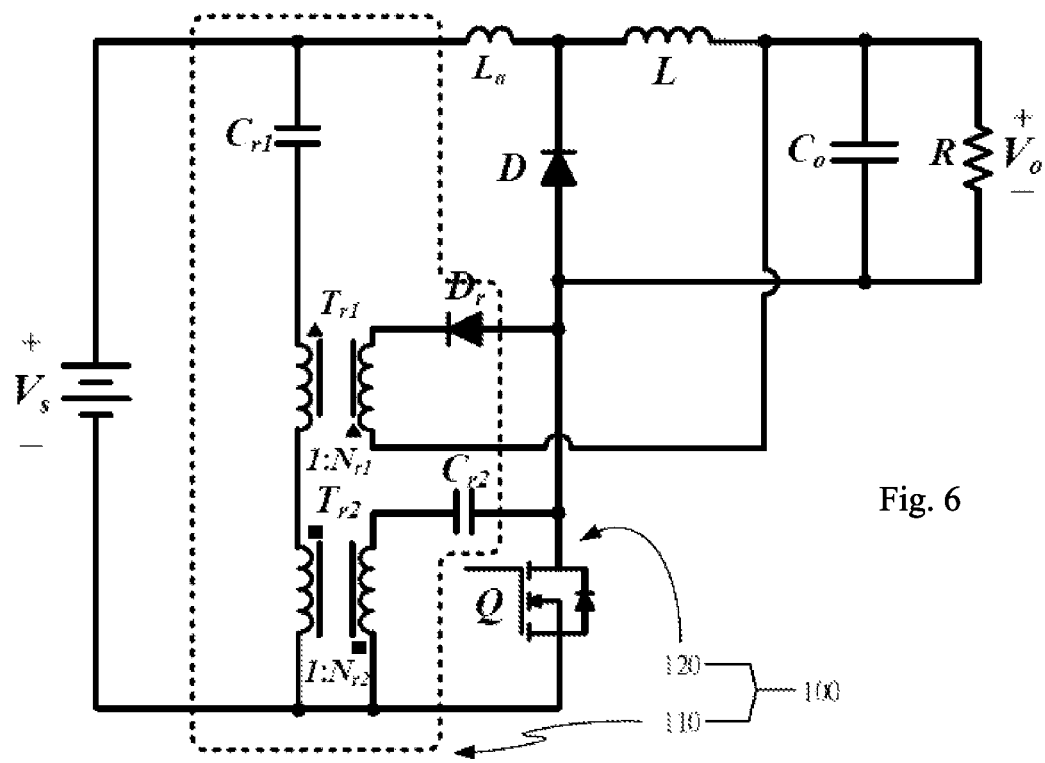
FIG. 6 shows a schematic diagram illustrating an electric circuit layout for a switching type Buck power converter having a zero input current ripple and added with the pulsating current ripple cancelling circuit in accordance with the present invention.
Figure 7:
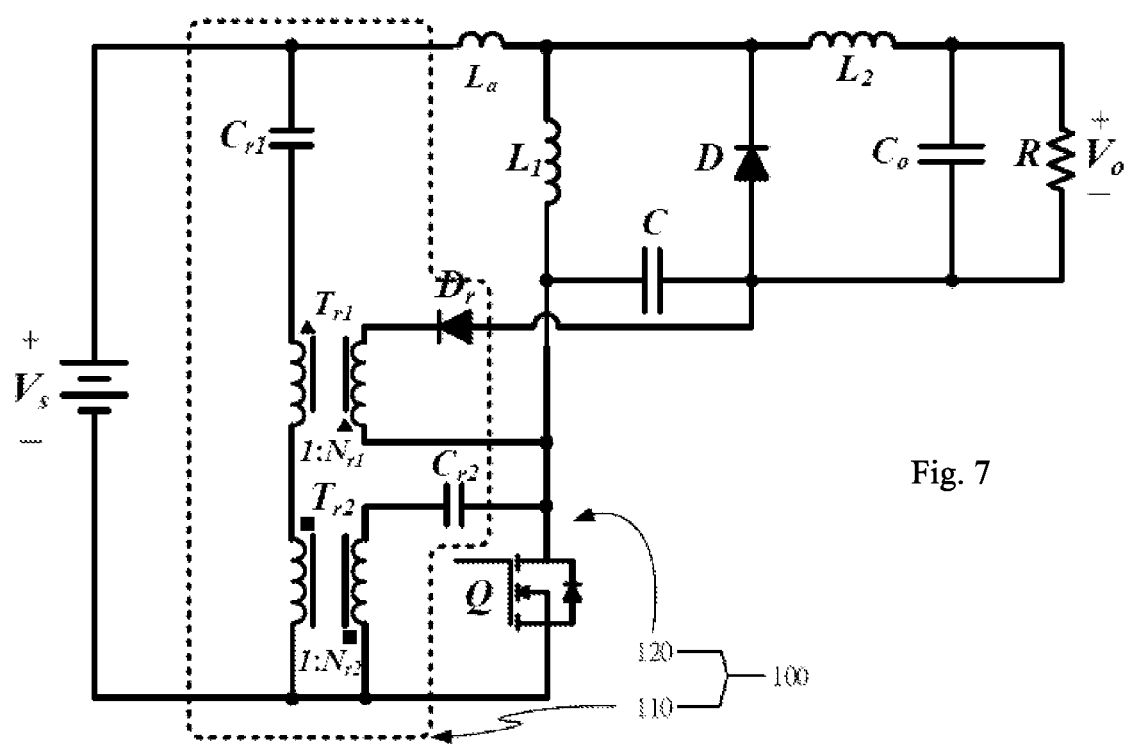
FIG. 7 shows a schematic diagram illustrating an electric circuit layout for a switching type Zeta power converter having a zero input current ripple and added with the pulsating current ripple cancelling circuit in accordance with the present invention.

In addition, the pulsating current ripple cancelling circuit in accordance with the present invention not only can be used to cancel the pulsating current ripple of the input end of the Flyback switching mode power converter, but also can be used to cancel the input pulsating current ripple of the Forward switching mode power converter (as shown in FIG. 4), the Buckboost switching mode power converter (as shown in FIG. 5), the Buck switching mode power converter (as shown in FIG. 6) or the Zeta switching mode power converter (as shown in FIG. 7).

Please refer to FIG. 4, which shows a schematic diagram illustrating an electric circuit layout for a switching type Forward power converter having a zero input current ripple after the addition of the pulsating current ripple cancelling circuit in accordance with the present invention. The converter 120 includes a power supply, an active switch Q, a third transformer Tf, a first inductor L, a third diode D1, a fourth diode D2 and a third capacitor Co, wherein the secondary winding side of the third transformer Tf, the fourth diode D2, the third capacitor Co and a resistor R are coupled together; the third diode D1 is located in between the fourth diode D2 and the secondary winding side of the third transformer Tf; the first inductor L is located in between the fourth diode D2 and the third capacitor Co. The power supply provides input end voltage Vs, wherein the first input end IP1 and the second input end IP2 is respectively coupled to the two ends of the power supply. The first output end OP1 is coupled to the secondary winding side of the third transformer Tf, so that the first diode Dr is located in between the secondary winding side of the first transformer Tr1 and the secondary winding side of the third transformer Tf. The second output end OP2 is coupled to the first inductor L, so that the secondary winding side of the first transformer Tr1 is located in between the first diode Dr and the first inductor L. The third output OP3 is coupled to the primary winding side of the third transformer Tf and one end of the active switch Q, so that the second capacitor Cr2 is located in between the active switch Q and the secondary winding side of the second transformer Tr2. The fourth output end OP4 is coupled to the other end of active switches Q, therefore, the secondary winding side of the second transformer Tr2 is located in between the active switch Q and the second capacitor Cr2.

Please refer to FIG. 5, which shows a schematic diagram illustrating an electric circuit layout for a switching type Buckboost power converter having a zero input current ripple owing to the addition of the pulsating current ripple cancelling circuit in accordance with the present invention. The converter 120 includes a power supply, an active switch Q, a first inductor L, a second inductor La, a second diode D and a third capacitor Co, wherein the first inductor L, the third capacitor Co and a resistor R are coupled together; the second diode D is located in between the first inductor L and the third capacitor Co; and the second inductor La is located in between the first inductor L and the first capacitor Cr1. The power supply provides input end voltage Vs, wherein the first input end IP1 and the second input end IP2 is respectively coupled to the two ends of the power supply. The first output end OP1 is coupled to the second diode D, so that the first diode Dr is located in between the secondary winding side of the first transformer Tr1 and the second diode D. The second output end OP2 is coupled to the first inductor L, so that the secondary winding side of the first transformer Tr1 is located in between the first diode Dr and the first inductor L. The third output OP3 is coupled to one end of the active switch Q, so that the second capacitor Cr2 is located in between the active switch Q and the secondary winding side of the second transformer Tr2. The fourth output end OP4 is coupled to the other end of active switches Q, therefore, the secondary winding side of the second transformer Tr2 is located in between the active switch Q and the second capacitor Cr2.

Please refer to FIG. 6, which shows a schematic diagram illustrating an electric circuit layout for a switching type Buck power converter having a zero input current ripple and added with the pulsating current ripple cancelling circuit in accordance with the present invention. The converter 120 includes a power supply, an active switch Q, a first inductor L, a second inductor La, a second diode D and a third capacitor Co, wherein the second diode D, the third capacitor Co and a resistor R are coupled together; the first inductor L is located in between the second diode D and the third capacitor Co; and the second inductor La is located in between the second diode D and the first capacitor Cr1. The power supply provides input end voltage Vs, wherein the first input end IP1 and the second input end IP2 is respectively coupled to the two ends of the power supply. The first output end OP1 is coupled to the second diode D, so that the first diode Dr is located in between the secondary winding side of the first transformer Tr1 and the second diode D. The second output end OP2 is coupled to the first inductor L, so that the secondary winding side of the first transformer Tr1 is located in between the first diode Dr and the first inductor L. The third output OP3 is coupled to one end of the active switch Q, so that the second capacitor Cr2 is located in between the active switch Q and the secondary winding side of the second transformer Tr2. The fourth output end OP4 is coupled to the other end of active switch Q, therefore, the secondary winding side of the second transformer Tr2 is located in between the active switch Q and the second capacitor Cr2.

Please refer to FIG. 7, which shows a schematic diagram illustrating an electric circuit layout for a switching type Zeta power converter having a zero input current ripple and added with the pulsating current ripple cancelling circuit in accordance with the present invention. The converter 120 includes a power supply, an active switch Q, a second inductor La, a third inductor L1, a forth inductor L2, a second diode D, a third capacitor Co and a forth capacitor C, wherein third inductor L1, the second diode D, the third capacitor Co and a resistor R are coupled together; the forth inductor L2 is located in between the second diode D and the third capacitor Co; the forth capacitor C is located in between the third inductor L1 and the second diode D; and the second inductor La is located in between the third inductor L1 and the first capacitor Cr1. The power supply provides input end voltage Vs, wherein the first input end IP1 and the second input end IP2 is respectively coupled to the two ends of the power supply. The first output end OP1 is coupled to the second diode D, so that the first diode Dr is located in between the secondary winding side of the first transformer Tr1 and the second diode D. The second output end OP2 is coupled to the third inductor L1, so that the secondary winding side of the first transformer Tr1 is located in between the first diode Dr and the third inductor L1. The third output OP3 is coupled to one end of the active switch Q, so that the second capacitor Cr2 is located in between the active switch Q and the secondary winding side of the second transformer Tr2. The fourth output end OP4 is coupled to the other end of active switches Q, therefore, the secondary winding side of the second transformer Tr2 is located in between the active switch Q and the second capacitor Cr2.

In short, in order to eliminate the pulsating current ripple of the input end of the converter, the primary winding side of the ripple cancelling transformer is electrically coupled to the primary winding side of the high frequency transformer and one direct current blocking capacitor in succession, and then the aforementioned components are coupled to the input end of the converter; finally, the secondary winding side of the ripple cancelling transformer is electrically coupled to the ripple cancelling diode, and then it is coupled to the output end of the converter or the intermediate capacitor; the secondary winding side of the high frequency transformer is electrically coupled to another direct current blocking capacitor, and then it is coupled to the both end of the active switch of the converter.

Figure 8:
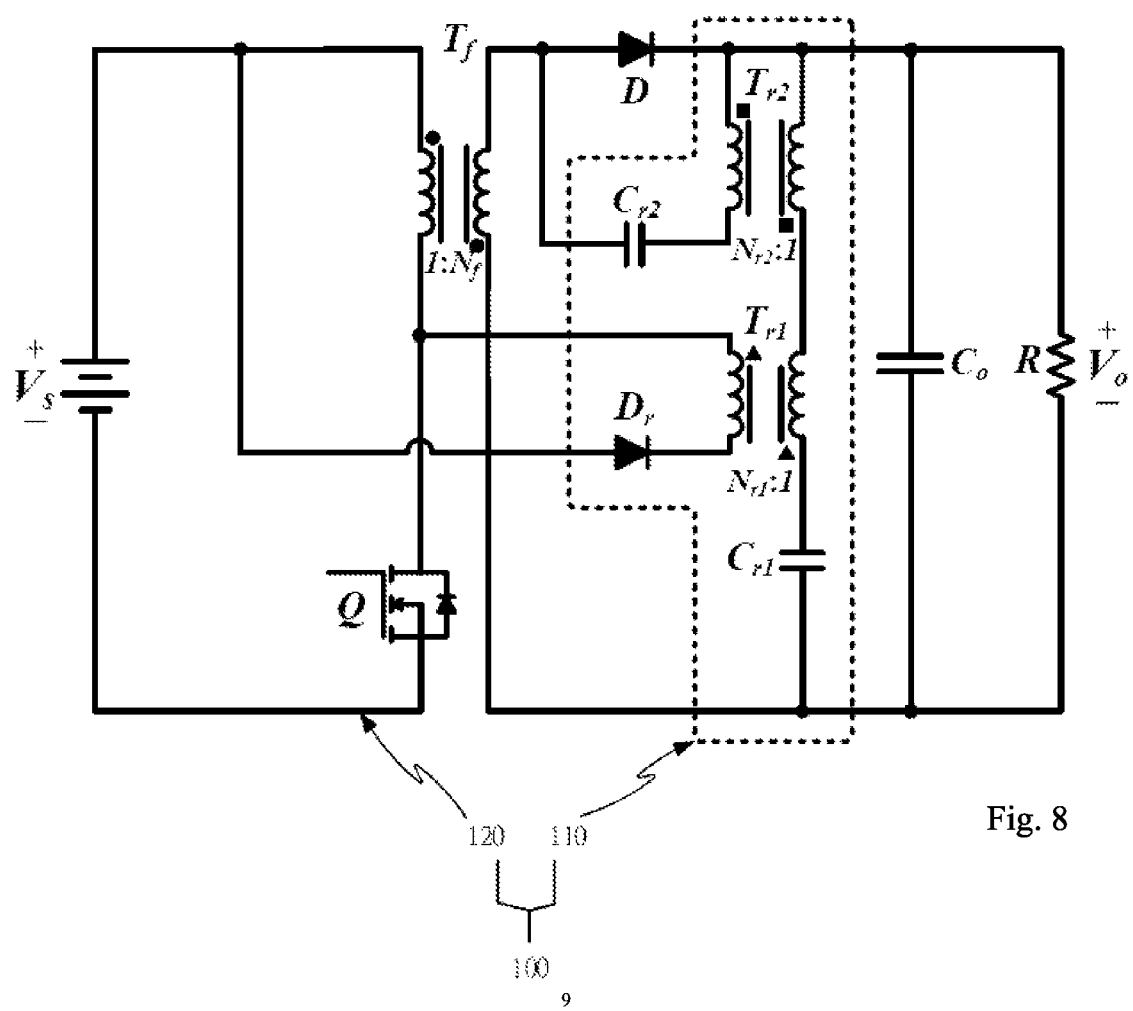
FIG. 8 shows a schematic diagram illustrating an electric circuit layout for a switching type Flyback power converter having a zero output current ripple and added with the pulsating current ripple cancelling circuit in accordance with the present invention.
Figure 9:
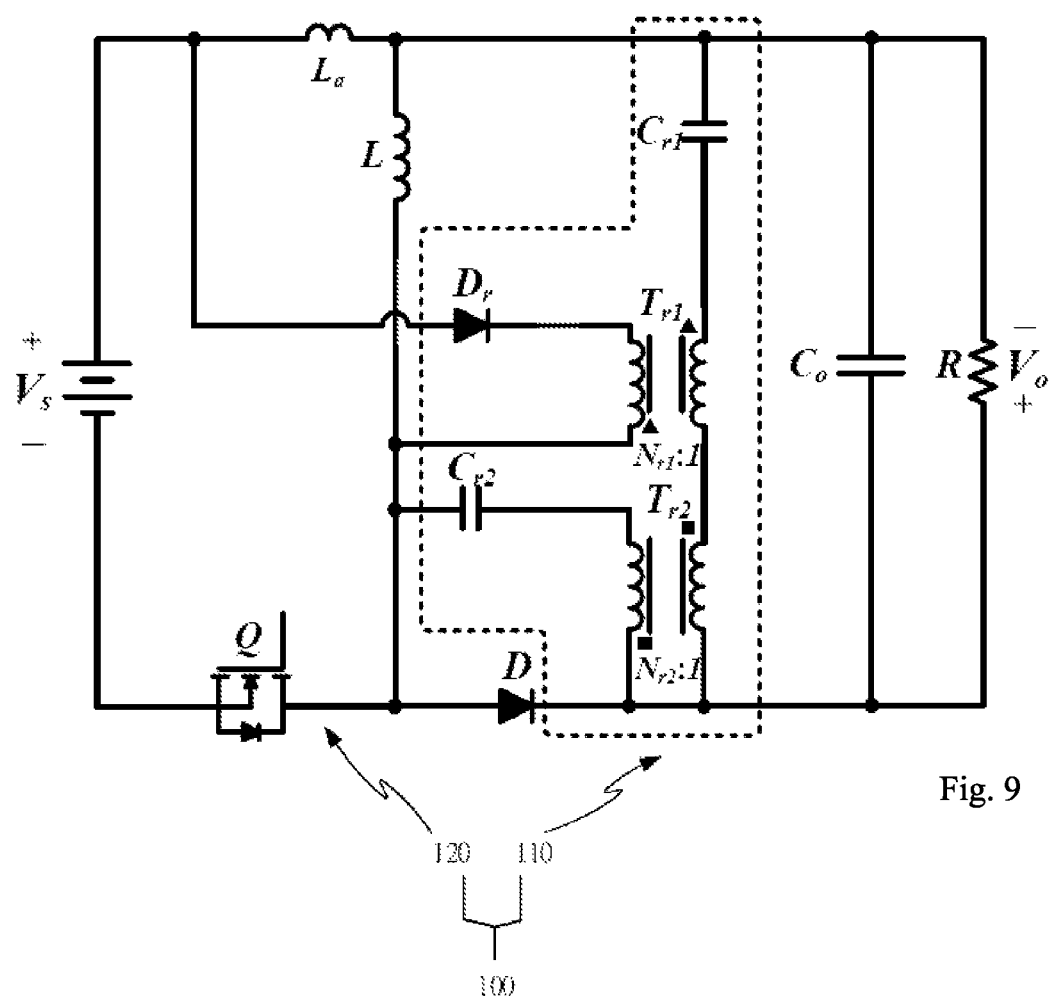
FIG. 9 shows a schematic diagram illustrating an electric circuit layout for a switching type Buckboost power converter having a zero output current ripple owing to the addition of the pulsating current ripple cancelling circuit in accordance with the present invention.
Figure 10:
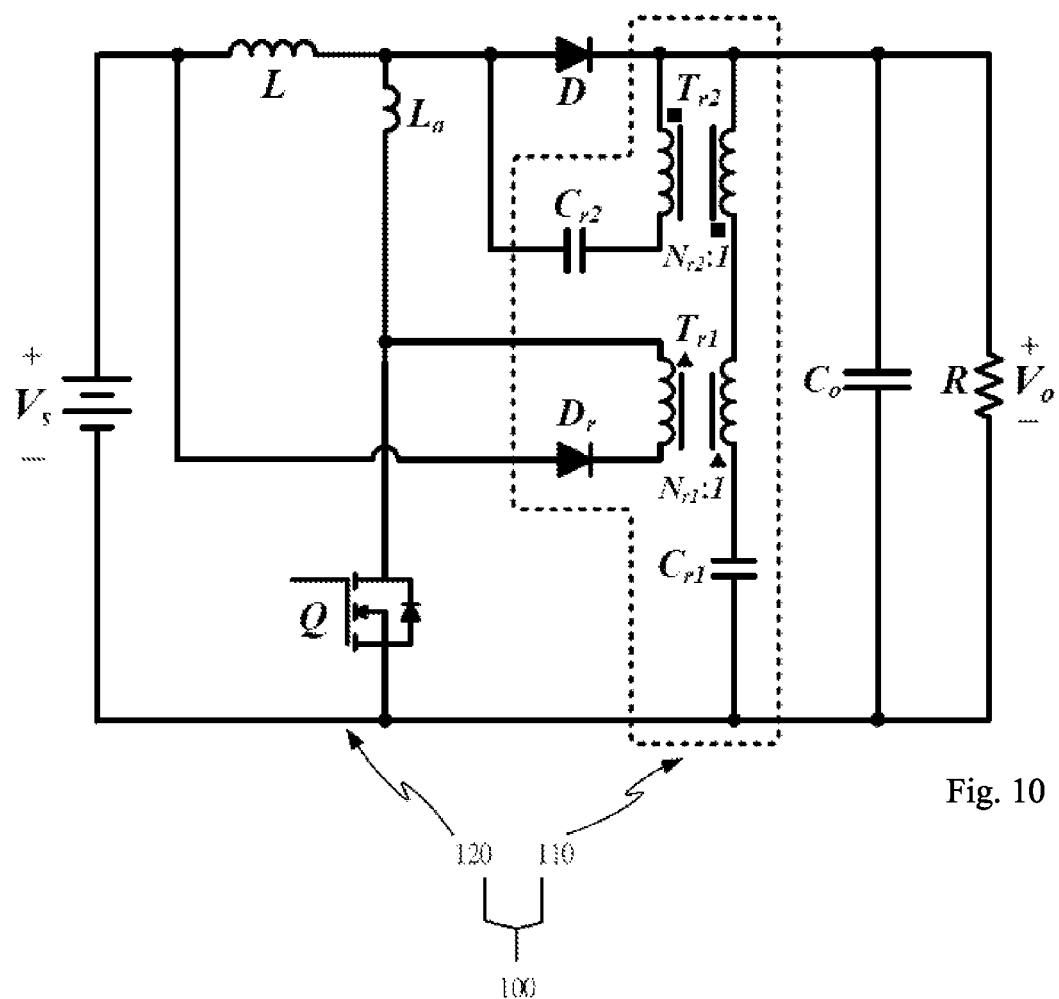
FIG. 10 shows a schematic diagram illustrating an electric circuit layout for a switching type Boost power converter having a zero output current ripple owing to the addition of the pulsating current ripple cancelling circuit in accordance with the present invention.
Figure 11:
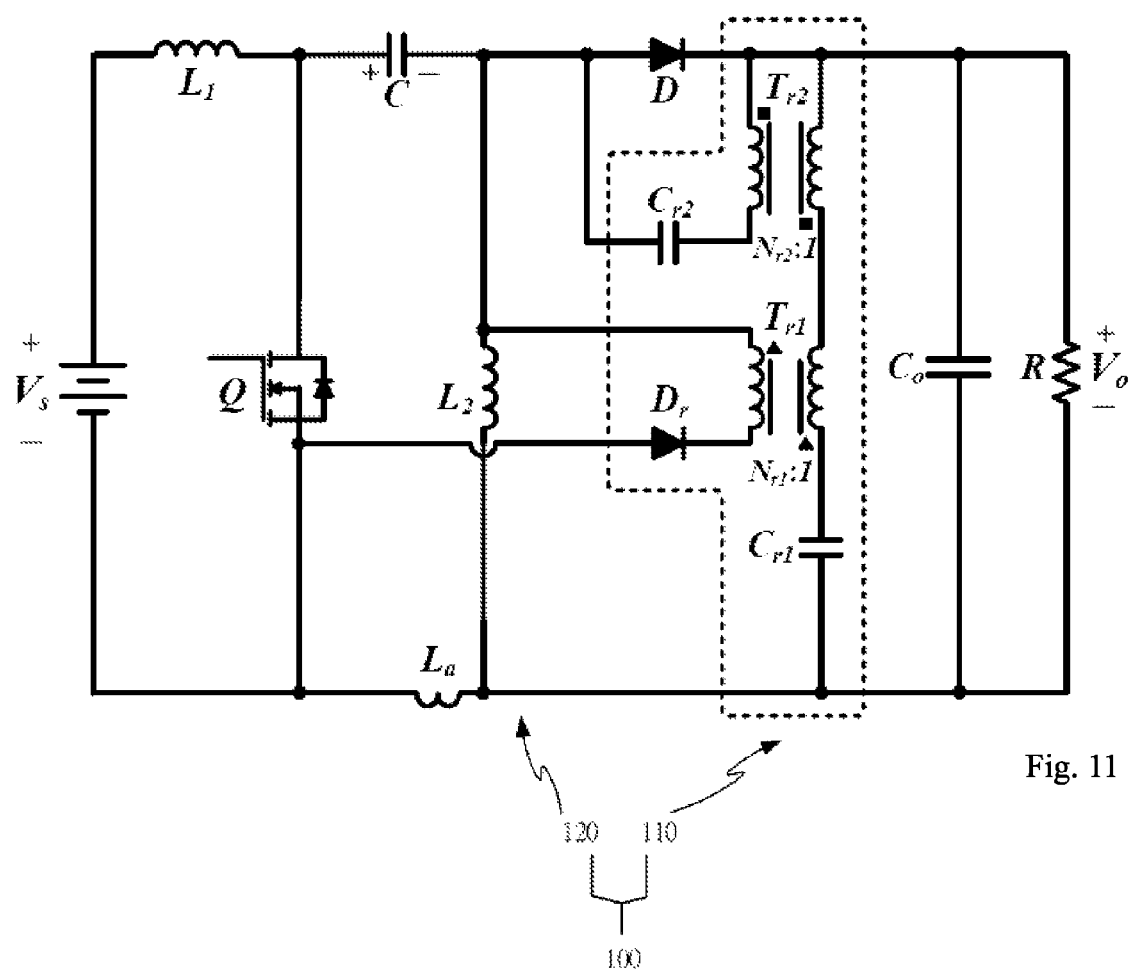
FIG. 11 shows a schematic diagram illustrating an electric circuit layout for a switching type Sepic power converter having a zero output current ripple due to the addition of the pulsating current ripple cancelling circuit in accordance with the present invention.

In addition, the pulsating current ripple cancelling circuit in accordance with the present invention can eliminate the output pulsating current ripple of one of or the combinations of the following transformers: the Flyback switching mode power converter (as shown in FIG. 8), the Buckboost switching mode power converter (as shown in FIG. 9), the boost switching mode power converter (as shown in FIG. 10) and the Sepic switching mode power converter (as shown in FIG. 11).

Please refer to FIG. 8, which shows a schematic diagram illustrating an electric circuit layout for a switching type Flyback power converter having a zero output current ripple and added with the pulsating current ripple cancelling circuit in accordance with the present invention. The converter 120 includes a power supply, an active switch Q, a second diode D, a third transformer Tf and a third capacitor Co, wherein the third capacitor Co is coupled with a resistor R; the second diode D is located in between the secondary winding side of the second transformer Tr2 and the second capacitor Cr2; and the primary winding side of the third transformer Tf is located in between the power supply and the active switch Q. The power supply provides input end voltage Vs, wherein the first input end IP1 and the second input end IP2 are respectively coupled to the two ends of the third capacitor Co. The first output end OP1 is coupled to the power supply and the primary winding side of the third transformer Tf. The second output end OP2 is coupled to the primary winding side of the third transformer Tf, so that the secondary winding side of the first transformer Tr1 is located in between the first diode Dr and the primary winding side of the third transformer Tf. The third output end OP3 and the fourth output end OP4 are respectively coupled to the two ends of the second diode D.

Please refer to FIG. 9, which shows a schematic diagram illustrating an electric circuit layout for a switching type Buckboost power converter having a zero output current ripple owing to the addition of the pulsating current ripple cancelling circuit in accordance with the present invention. The converter 120 includes a power supply, an active switch Q, a second diode D, a first inductor L, a second inductor La and a third capacitor Co, wherein the third capacitor Co is coupled with a resistor R; the second diode D is located in between the secondary winding side of the second transformer Tr2 and the second capacitor Cr2; and the first inductor L and the second inductor La are located in between the power supply and the active switch Q. The power supply provides input end voltage Vs, wherein the first input end IP1 and the second input end IP2 are respectively coupled to the two ends of the third capacitor Co. The first output end OP1 is coupled to the power supply and the second inductor La. The second output end OP2 is coupled to the first inductor L, so that the secondary winding side of the first transformer Tr1 is located in between the first diodes Dr and the first inductor L. The third output end OP3 is coupled to the first inductor L, so that the second capacitor Cr2 is located in between the first inductor L and the secondary winding side of the second transformer Tr2. The fourth output end OP4 is coupled to second diode D, so that the secondary winding side of the second transformer Tr2 is located in between the second diode D and the second capacitor Cr2, wherein the second diode D is coupled to the active switch Q.

Please refer to FIG. 10, which shows a schematic diagram illustrating an electric circuit layout for a switching type Boost power converter having a zero output current ripple owing to the addition of the pulsating current ripple cancelling circuit in accordance with the present invention. The converter 120 includes a power supply, an active switch Q, a second diode D, a first inductor L, a second inductor La and a third capacitor Co, wherein the third capacitor Co is coupled with a resistor R; the second diode D is located in between the secondary winding side of the second transformer Tr2 and the second capacitor Cr2; and the first inductor L and the second inductor La are located in between the power supply and the active switch Q. The power supply provides input end voltage Vs, wherein the first input end IP1 and the second input end IP2 are respectively coupled to the two ends of the third capacitor Co. The first output end OP1 is coupled to the power supply and the first inductor L. The second output end OP2 is coupled to the second inductor La, so that the secondary winding side of the first transformer Tr1 is located in between the second inductor La and the first diodes Dr. The third output end OP3 is coupled to the second diode D, so that the second capacitor Cr2 is located in between the second diode D and the secondary winding side of the second transformer Tr2. The fourth output end OP4 is coupled to second diode D, so that the secondary winding side of the second transformer Tr2 is located in between the second diode D and the second capacitor Cr2, wherein the second diode D is coupled to the second inductor La.

Please refer to FIG. 11, which shows a schematic diagram illustrating an electric circuit layout for a switching type Sepic power converter having a zero output current ripple due to the addition of the pulsating current ripple cancelling circuit in accordance with the present invention.

The converter 120 includes a power supply, an active switch Q, a second diode D, a second inductor La, a third inductor L1, a forth inductor L2, a third capacitor Co and a forth capacitor C, wherein the third capacitor Co is coupled with a resistor R; the forth inductor L2 and the active switch Q are coupled with the power supply; the third inductor L1 is located in between the power supply and the forth capacitor C; the forth capacitor C and the second inductor La are respectively located in between the active switch Q and the second diode D. The power supply provides input end voltage Vs, wherein the first input end IP1 and the second input end IP2 are respectively coupled to the two ends of the third capacitor Co. The first output end OP1 is coupled to the active switch Q. The second output end OP2 is coupled to the forth inductor L2, so that the secondary winding side of the first transformer Tr1 is located in between the forth inductor L2 and the first diode Dr. The third output end OP3 is coupled to the second diode D, so that the second capacitor Cr2 is located in between the second diode D and the secondary winding side of the second transformer Tr2. The fourth output end OP4 is coupled to second diode D, so that the secondary winding side of the second transformer Tr2 is located in between the second diode D and the second capacitor Cr2, wherein the second diode D is coupled to the forth capacitor C.

In short, in order to eliminate the pulsating current ripple of the output end of the converter, the primary winding side of the ripple cancelling transformer is electrically coupled to the primary winding side of the high frequency transformer and one direct current blocking capacitor in succession, and then the aforementioned components are coupled to the output end of the converter; the secondary winding side of the ripple cancelling transformer is electrically coupled to the ripple cancelling diode, and it is coupled to the two ends of the power input of the converter or the circuit in accordance with an intermediate capacitor electrically coupled with a switch, finally, the secondary winding side of the high frequency transformer is electrically coupled with another direct current blocking capacitor and coupled to the two ends of diode of the converter in succession.

Figure 12:
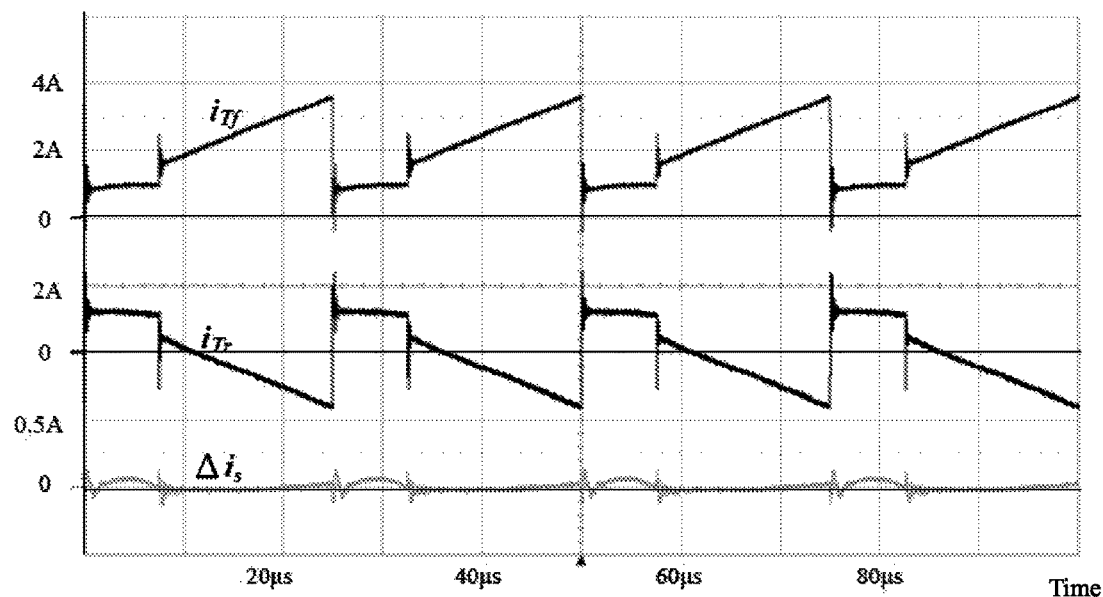
FIG. 12 shows a diagram illustrating multiple practical current waveforms actually measured from an input current iTf of the Flyback transformer, a pulsating current ripple cancelling current iTr and a input current ripple $\Delta$is, in a switching type Flyback power converter having a zero input current ripple in accordance with the present invention.

According to the aforementioned theory, following describes an implemented and measured result of the embodiment in accordance with the present invention which is a zero input current ripple Flyback mode direct current power converter. The basic specifications of the circuit are input 30 Vdc, output 70 Vdc, switching frequency 40 kHz and a rated power of 100 W. Please refer to FIG. 12, which shows a diagram illustrating the current waveform of the circuit embodiment (the waveform that the label of the vertical axis top-down is 2 A/div., 2 A/div. and 500 mA/div in sequence, and the label of the horizontal axis is 10 ms/div.), it is observed that the constituent waveform of the ripple of the pulsating current ripple cancelling current iTr and the input current iTf of the Flyback transformer are opposite to each other. When the switch of the converter is turned on, the input current iTf of the Flyback transformer is increasing with a positive slope and the pulsating current ripple cancelling current iTr is decreasing with a negative slope; when the switch of the converter is turned off, the slope of the current iTr and the current iTf can still compensate for each other. For the reason that the pulsating current ripple cancelling current can be used to compensate for the pulsating current of the input end of the Flyback transformer which makes the synthesized input current ripple is close to zero.

Figure 13:
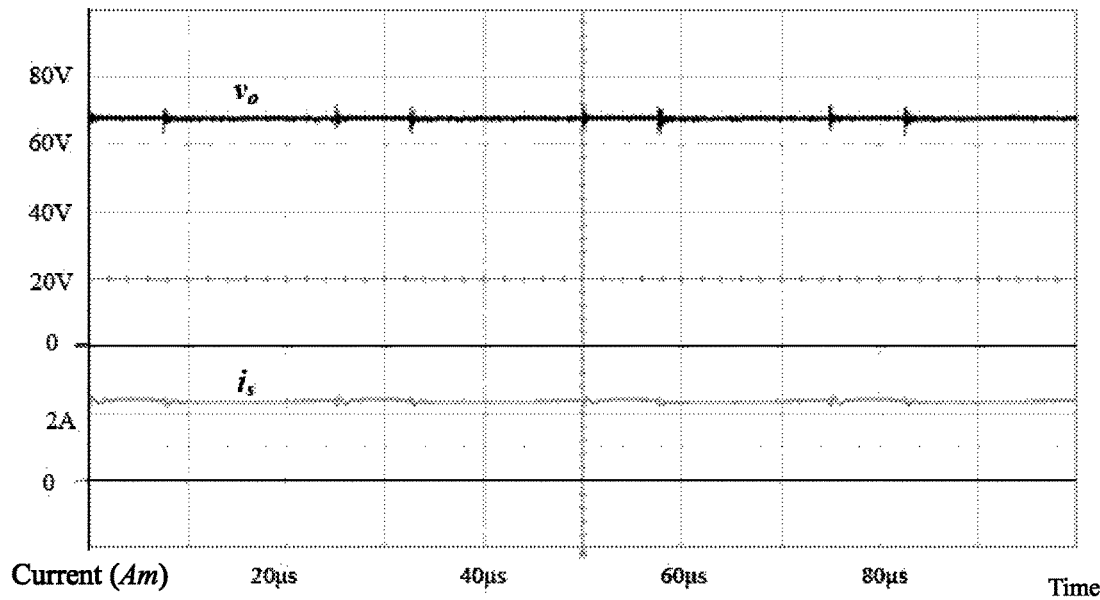
FIG. 13 shows a diagram illustrating multiple practical voltage and current waveforms actually measured from an output voltage Vo and input current is, in a switching type Flyback power converter having a zero input current ripple in accordance with the present invention.

The measured waveform of the output end voltage vo and the input current is of the circuit embodiment is shown in FIG. 13. Please refer to FIG. 13 (the waveform that the label of the vertical axis top-down is 20 V/div. and 2 A/div. in sequence and the label of the horizontal axis is 10 ms/div.), it is observed that the current of the input end of the original Flyback converter is a stable direct current after adding the pulsating current ripple cancelling circuit in accordance with the present invention. Therefore, the above measured waveform may prove that the pulsating current ripple cancelling circuit in accordance with the present invention does have a good pulsating current ripple cancelling effect.

According to the experimental results of the embodiments shown above, the current of the input end can be almost pure direct current after adding the pulsating current ripple cancelling circuit in accordance with the present invention to the switch mode power converter with pulsating current ripple on the input end.

Figure 14:
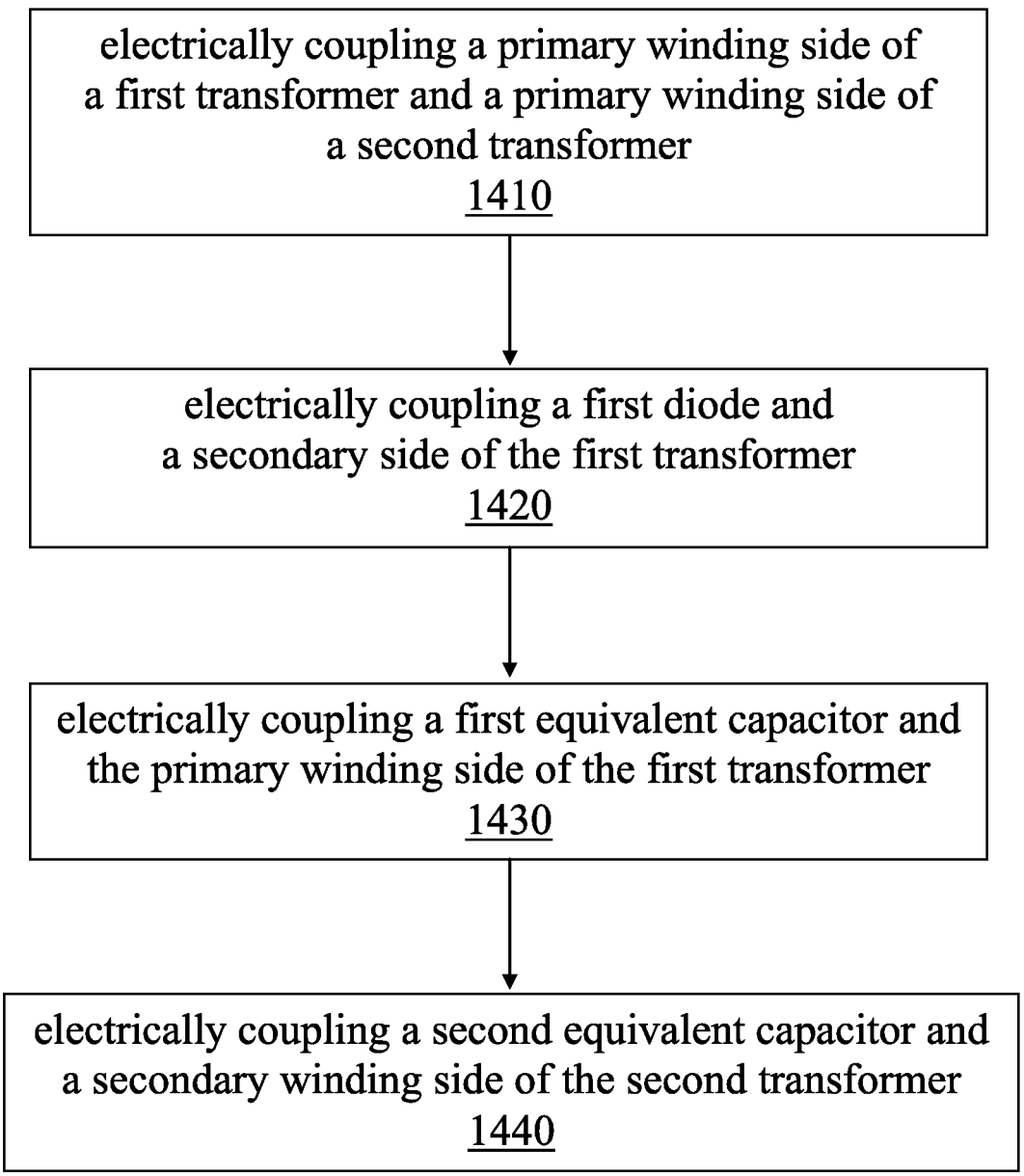
FIG. 14 shows a flow chart illustrating a series of steps for forming the pulsating current ripple cancelling circuit in accordance with the present invention.

According to the aforementioned, the present invention further provides a method for forming an electric circuit for cancelling the pulsating current ripple. As shown in FIG. 14, the method for forming an electric circuit for cancelling the pulsating current ripple includes steps as follow. As recited in step 1410: electrically coupling a primary winding side of a first transformer and a primary winding side of a second transformer. As recited in step 1420: electrically coupling a first diode and a secondary side of the first transformer. As recited in step 1430: electrically coupling a first equivalent capacitor and the primary winding side of the first transformer. As recited in step 1440: electrically coupling a second equivalent capacitor and a secondary winding side of the second transformer.

Figure 15:
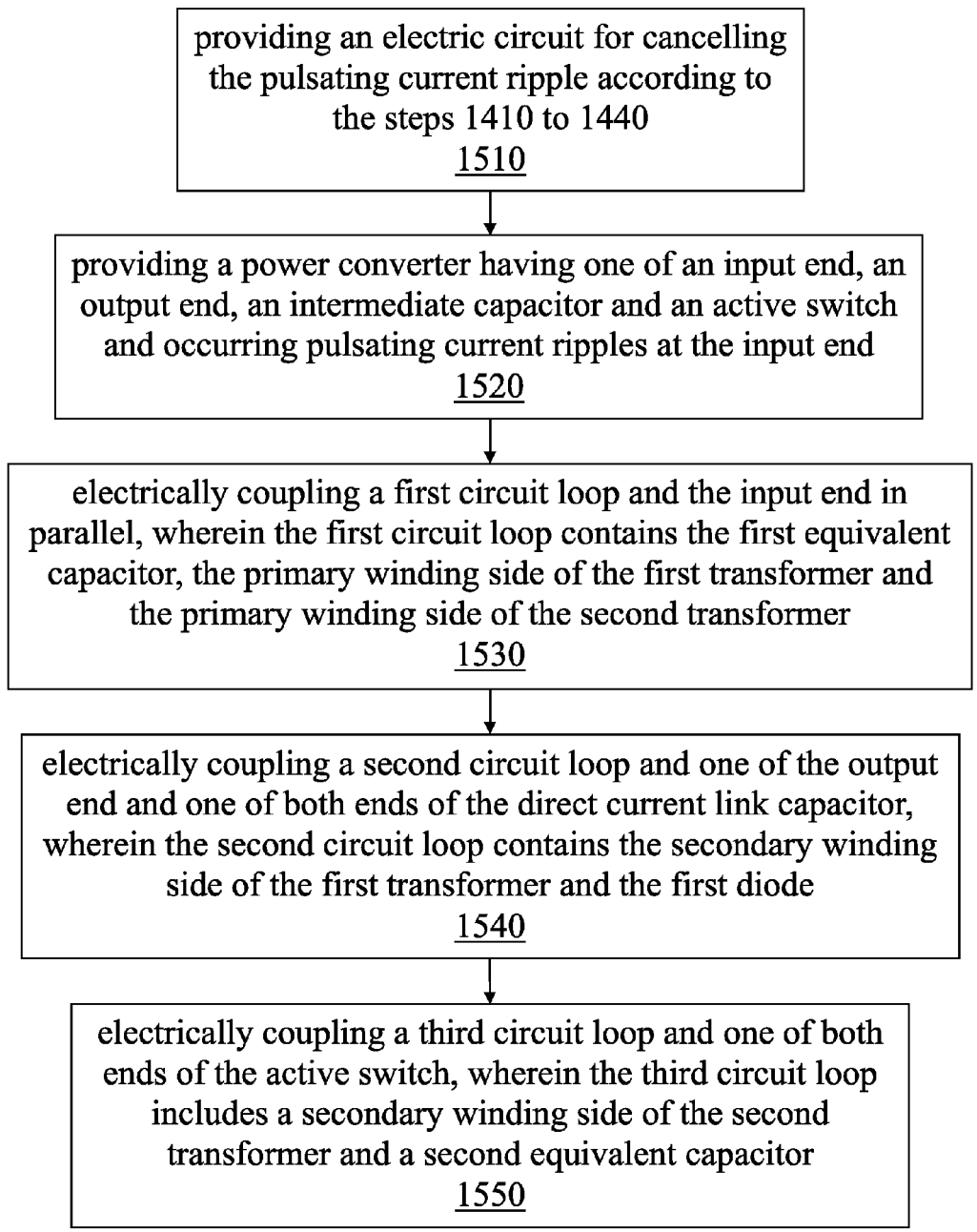
FIG. 15 shows a flow chart illustrating a series of steps forming a power converting system having a zero input current ripple by using the pulsating current ripple cancelling circuit in accordance with the present invention.

Furthermore, the present invention provides a method for forming a power converting system having a zero input current ripple. As shown in FIG. 15, the method for forming a power converting system having a zero input current ripple includes steps as follow. As recited in step 1510: providing an electric circuit for cancelling the pulsating current ripple according to the steps 1410 to 1440 as mentioned above. As recited in step 1520: providing a power converter having one of an input end, an output end, an intermediate capacitor and an active switch and occurring pulsating current ripples at the input end. The intermediate capacitor is a selective component and some type of converter may not have the intermediate capacitor. As recited in step 1530: electrically coupling a first circuit loop and the input end in parallel, wherein the first circuit loop contains the first equivalent capacitor, the primary winding side of the first transformer and the primary winding side of the second transformer. As recited in step 1540: electrically coupling a second circuit loop and one of the output end and one of both ends of the intermediate capacitor in parallel, wherein the second circuit loop contains the secondary winding side of the first transformer and the first diode. As recited in step 1550: electrically coupling a third circuit loop and one of both ends of the active switch in parallel, wherein the third circuit loop includes a secondary winding side of the second transformer and a second equivalent capacitor.

Figure 16:
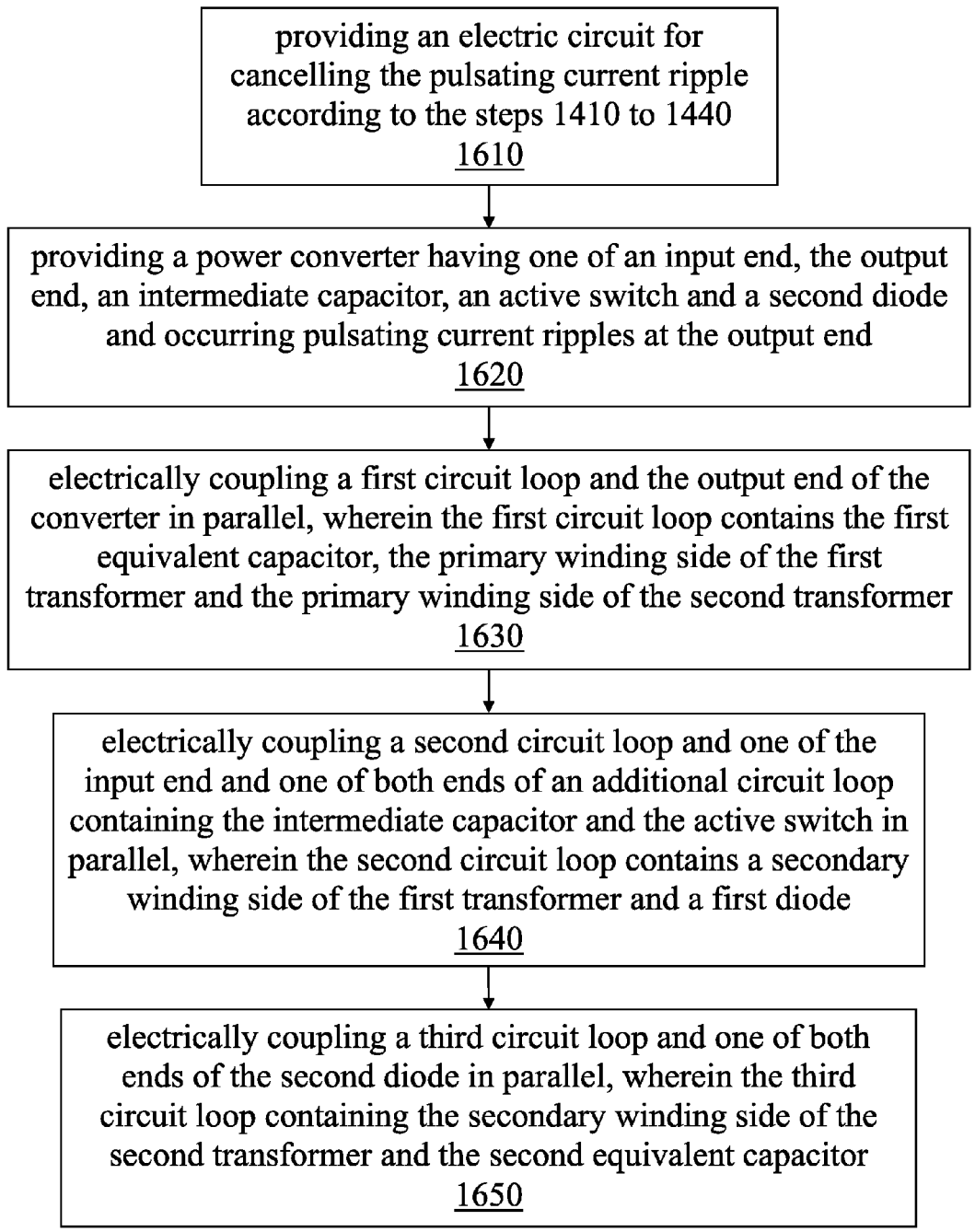
FIG. 16 shows a flow chart illustrating a series of steps forming a power converting system having a zero output current ripple by using the pulsating current ripple cancelling circuit in accordance with the present invention.

Furthermore, the present invention provides a method for forming a power converting system having a zero output current ripple. As shown in FIG. 16, the method for forming a power converting system having a zero output current ripple includes steps as follow. As recited in step 1610: providing an electric circuit for cancelling the pulsating current ripple according to the steps 1410 to 1440 as mentioned above. As recited in step 1620: providing a power converter having one of an input end, the output end, an intermediate capacitor, an active switch and a second diode and occurring pulsating current ripples at the output end. The intermediate capacitor is a selective component and some type of converter may not have the intermediate capacitor. As recited in step 1630: electrically coupling a first circuit loop and the output end of the converter in parallel, wherein the first circuit loop contains the first equivalent capacitor, the primary winding side of the first transformer and the primary winding side of the second transformer. As recited in step 1640: electrically coupling a second circuit loop and one of the input end and one of both ends of an additional circuit loop containing the intermediate capacitor and the active switch in parallel, wherein the second circuit loop contains a secondary winding side of the first transformer and a first diode. As recited in step 1650: electrically coupling a third circuit loop and one of both ends of the second diode in parallel, wherein the third circuit loop containing the secondary winding side of the second transformer and the second equivalent capacitor.

There are further embodiments provided as follows.

Embodiment 1

A pulsating current ripple cancelling circuit includes a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the secondary winding side of the first transformer; a first equivalent capacitor combination electrically coupled with the primary winding side of the first transformer; and a second equivalent capacitor combination electrically coupled with the secondary winding side of the second transformer.

Embodiment 2

The circuit as described in Embodiment 1, the first equivalent capacitor combination, the second equivalent capacitor combination, the first diode, the secondary winding side of the first transformer, the primary winding side and the secondary winding side of the second transformer are coupled with the a converter, wherein the first diode is coupled between the secondary winding side of the first transformer and the converter, the secondary winding side of the first transformer is coupled between the first diode and the converter, the second equivalent capacitor combination is coupled between the secondary winding side of the second transformer and the converter, the secondary winding side of the second transformer is coupled between the second equivalent capacitor combination and the converter, the first equivalent capacitor combination is coupled between the primary winding side of the first transformer and the converter, and the primary winding side of the second transformer is coupled between the primary winding side of the first transformer and the converter.

Embodiment 3

The circuit as described in Embodiment 1, the first equivalent capacitor combination, the primary winding side of the first transformer and the primary winding side of the second transformer form a first serial circuit which is coupled with an input of a converter having one of the input end, an output end, an intermediate capacitor and an active switch, the secondary winding side of the first transformer and the first diode form a second serial circuit which is coupled with one of the output end and one of both ends of the intermediate capacitor, and the secondary winding side of the second transformer and the second equivalent capacitor form a third serial circuit which is coupled with one of both ends of the active switch.

Embodiment 4

The circuit as described in Embodiment 3, the converter further includes a power source for providing a first current, the current flowing through the primary winding side of the first transformer is a second current, the current flowing into the converter is a third current, wherein the second current and the third current respectively have waveform phases opposite to each other so as to synthesize the first current, which is a direct current.

Embodiment 5

The circuit as described in Embodiment 3, the converter is one selected from a group consisting of a Flyback switch mode power converter, a Forward switch mode power converter, a Buckboost switch mode power converter, a Buck switch mode power converter, a Zeta switch mode power converter, a converter having current ripples at an input end thereof and a combination thereof.

Embodiment 6

The circuit as described in Embodiment 1, the first equivalent capacitor combination, the primary winding side of the first transformer and the primary winding side of the second transformer form a first serial circuit which is coupled with an output end of a converter having one of an input end, the output end, an intermediate capacitor, an active switch and a second diode, the secondary winding side of the first transformer and the first diode form a second serial circuit which is coupled with one of the input end and one of both ends of an additional serial circuit comprising the intermediate capacitor and the active switch, and the secondary winding side of the second transformer and the second equivalent capacitor form a third serial circuit which is coupled with one of both ends of the second diode.

Embodiment 7

The circuit as described in Embodiment 6, the converter provides an output current, the current flowing through the primary winding side of the first transformer is a second current, the current flowing out of the converter is a third current, wherein the second current and the third current respectively have waveform phases opposite to each other so as to synthesize the first current, which is a direct current.

Embodiment 8

The circuit as described in Embodiment 6, the converter is one selected from a group consisting of a Flyback switch mode power converter, a Buckboost switch mode power converter, a Boost switch mode power converter, a Sepic switch mode power converter, a converter having current ripples at an output end thereof and a combination thereof.

Embodiment 9

A pulsating current ripple cancelling circuit includes a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the loop coupled with the secondary winding side of the first transformer; a first equivalent capacitor combination electrically coupled with the loop coupled with the primary winding side of the first transformer in series; and a second equivalent capacitor combination electrically coupled with the loop coupled with the secondary winding side of the second transformer in series.

Embodiment 10

A power converting system having a pulsating current ripple cancelling circuit includes a converter; and a pulsating current ripple cancelling circuit electrically coupled with the converter and further including: a first transformer having a primary winding side and a secondary winding side; a second transformer having a primary winding side and a secondary winding side, wherein the primary winding side of the second transformer is electrically coupled with the primary winding side of the first transformer; a first diode electrically coupled with the secondary winding side of the first transformer; a first equivalent capacitor combination electrically coupled with the primary winding side of the first transformer; and a second equivalent capacitor combination electrically coupled with the secondary winding side of the second transformer.

Embodiment 11

The system as described in Embodiment 10, the first equivalent capacitor combination, the primary winding side of the first transformer and the primary winding side of the second transformer form a first serial circuit which is coupled with an input of a converter having one of the input end, an output end, an intermediate capacitor and an active switch, the secondary winding side of the first transformer and the first diode form a second serial circuit which is coupled with one of the output end and one of both ends of the intermediate capacitor, and the secondary winding side of the second transformer and the second equivalent capacitor form a third serial circuit which is coupled with one of both ends of the active switch.

Embodiment 12

The system as described in Embodiment 11, the converter further includes a power source for providing a first current, the current flowing through the primary winding side of the first transformer is a second current, the current flowing through the primary winding side of the third transformer is a third current, wherein the second current and the third current respectively have waveform phases opposite to each other so as to synthesize the first current, which is a direct current.

Embodiment 13

The system as described in Embodiment 12, the converter further includes an active switch, wherein when the converter is in a closed mode, the active switch is closed, the first diode is reverse-biased. The second current flows from the primary winding side of the first transformer toward the first equivalent capacitor combination and the power energy provided by the power source is stored in the converter.

Embodiment 14

The system as described in Embodiment 12, the converter further includes an active switch, wherein when the converter is in a opened mode, the active switch is opened, the first diode is forward-biased. The second current flows from the first equivalent capacitor combination toward the primary winding side of the first transformer and the power energy stored in the converter is outputted.

Embodiment 15

The system as described in Embodiment 10, the first equivalent capacitor combination, the primary winding side of the first transformer and the primary winding side of the second transformer form a first serial circuit which is coupled with an output end of a converter having one of an input end, the output end, an intermediate capacitor, an active switch and a second diode, the secondary winding side of the first transformer and the first diode form a second serial circuit which is coupled with one of the input end and one of both ends of an additional serial circuit comprising the intermediate capacitor and the active switch, and the secondary winding side of the second transformer and the second equivalent capacitor form a third serial circuit which is coupled with one of both ends of the second diode.

Embodiment 16

The system as described in Embodiment 15, the converter provides an output current, the current flowing through the primary winding side of the first transformer is a second current, the current flowing out of the converter is a third current, wherein the second current and the third current respectively have waveform phases opposite to each other so as to synthesize the first current, which is a direct current.

To sum up, the present invention owns at least three advantages as follows.

(1) The present current ripple cancelling circuit can be used for eliminating the pulsating current ripples at an input end or an output end of a switching type power converter having pulsating current ripple, without additionally adding an active switching controller and a corresponding driving circuit thereof.

(2) The present pulsating current ripple cancelling circuit is totally unassociated with the operating parameters, such as duty ratio, switching frequency, input voltage specification and output voltage specification, in the original power converter.

(3) The present pulsating current ripple cancelling circuit has a simplified essential circuit layout and is easy to be modularized, which is convenience to integrate the switching type power converter having pulsating current ripples.

In conclusion, it can draw a conclusion that when the pulsating current ripple cancelling technology is applied to the switching type power converter having pulsating current ripples, it can render the power converter to have a current with zero ripple at the input end or the output end. The present invention can improve the defects and disadvantages in the prior arts, and therefore has great merit on industrial applicability.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A pulsating current ripple cancelling circuit applied in a converter in which there is an operating current with an operating current waveform, comprising:
   a first transformer having a primary winding side and a secondary winding side, receiving a part of the operating current and generating a mirror current with a mirror current waveform;

a second transformer having a primary winding side and a secondary winding side, wherein the primary winding side of the second transformer is electrically coupled with the primary winding side of the first transformer, the primary winding side of the second transformer and the secondary winding side of the second transformer are electrically connected with each other, and the secondary winding side of the second transformer and the secondary winding side of the first transformer are in disconnection;

a first diode electrically coupled with the secondary winding side of the first transformer;

a first equivalent capacitor combination electrically coupled with the primary winding side of the first transformer; and a second equivalent capacitor combination directly electrically coupled with the secondary winding side of the second transformer, wherein the mirror current is the part of the operating current and the mirror current waveform and the operating current waveform are opposite to each other so as to eliminate a pulsating current ripple in the operating current.

2. The circuit as claimed in claim 1, wherein the first equivalent capacitor combination, the second equivalent capacitor combination, the first diode, the secondary winding side of the first transformer, the primary winding side and the secondary winding side of the second transformer are coupled with the converter, wherein the first diode is coupled between the secondary winding side of the first transformer and the converter, the secondary winding side of the first transformer is coupled between the first diode and the converter, the second equivalent capacitor combination is coupled between the secondary winding side of the second transformer and the converter, the secondary winding side of the second transformer is coupled between the second equivalent capacitor combination and the converter, the first equivalent capacitor combination is coupled between the primary winding side of the first transformer and the converter, and the primary winding side of the second transformer is coupled between the primary winding side of the first transformer and the converter.

3. The circuit as claimed in claim 1, wherein the first equivalent capacitor combination, the primary winding side of the first transformer and the primary winding side of the second transformer form a first serial circuit which is coupled with an input of the converter having one of an input end, an output end, an intermediate capacitor and an active switch, the secondary winding side of the first transformer and the first diode form a second serial circuit which is coupled with one of the output end and one of both ends of the intermediate capacitor, and the secondary winding side of the second transformer and the second equivalent capacitor form a third serial circuit which is coupled with one of both ends of the active switch.

4. The circuit as claimed in claim 3, wherein the converter further comprises a power source for providing a first current, the current flowing through the primary winding side of the first transformer is a second current, the current flowing into the converter is a third current, wherein the second current and the third current respectively have waveform phases opposite to each other so as to synthesize the first current, which is a direct current.

5. The circuit as claimed in claim 3, wherein the converter is one selected from a group consisting of a Flyback switch mode power converter, a Forward switch mode power converter, a Buckboost switch mode power converter, a Buck switch mode power converter, a Zeta switch mode power converter, a converter having current ripples at an input end thereof and a combination thereof.

6. The circuit as claimed in claim 1, wherein the first equivalent capacitor combination, the primary winding side of the first transformer and the primary winding side of the second transformer form a first serial circuit which is coupled with an output end of the converter having one of an input end, the output end, an intermediate capacitor, an active switch and a second diode, the secondary winding side of the first transformer and the first diode form a second serial circuit which is coupled with one of the input end and one of both ends of an additional serial circuit comprising the intermediate capacitor and the active switch, and the secondary winding side of the second transformer and the second equivalent capacitor form a third serial circuit which is coupled with one of both ends of the second diode.

7. The circuit as claimed in claim 6, wherein the converter provides an output current, the current flowing through the primary winding side of the first transformer is a second current, the current flowing out of the converter is a third current, wherein the second current and the third current respectively have waveform phases opposite to each other so as to synthesize the first current, which is a direct current.

8. The circuit as claimed in claim 6, wherein the converter is one selected from a group consisting of a Flyback switch mode power converter, a Buckboost switch mode power converter, a Boost switch mode power converter, a Sepic switch mode power converter, a converter having current ripples at an output end thereof and a combination thereof.

9. A power converting system having a pulsating current ripple cancelling circuit, comprising:

a converter having an operating current with an operating current waveform; and the pulsating current ripple cancelling circuit electrically coupled with the converter and further comprising:

a first transformer having a primary winding side and a secondary winding side, receiving a part of the operating current and generating a mirror current with a mirror current waveform;

a second transformer having a primary winding side and a secondary winding side, wherein the primary winding side of the second transformer is electrically coupled with the primary winding side of the first transformer, the primary winding side of the second transformer and the secondary winding side of the second transformer are electrically connected with each other, and the secondary winding side of the second transformer and the secondary winding side of the first transformer are in disconnection;

a first diode electrically coupled with the secondary winding side of the first transformer;

a first equivalent capacitor combination electrically coupled with the primary winding side of the first transformer; and a second equivalent capacitor combination directly electrically coupled with the secondary winding side of the second transformer, wherein the mirror current is the part of the operating current and the mirror current waveform and the operating current waveform are opposite to each other so as to eliminate a pulsating current ripple in the operating current.

10. The system as claimed in claim 9, wherein the first equivalent capacitor combination, the primary winding side of the first transformer and the primary winding side of the second transformer form a first serial circuit which is coupled with an input of the converter having one of an input end, an output end, an intermediate capacitor and an active switch, the secondary winding side of the first transformer and the first diode form a second serial circuit which is coupled with one of the output end and one of both ends of the intermediate capacitor, and the secondary winding side of the second transformer and the second equivalent capacitor form a third serial circuit which is coupled with one of both ends of the active switch.

11. The system as claimed in claim 10, wherein the converter further comprises a power source for providing a first current, the current flowing through the primary winding side of the first transformer is a second current, the current flowing into the converter is a third current, wherein the second current and the third current respectively have waveform phases opposite to each other so as to synthesize the first current, which is a direct current.

12. The system as claimed in claim 11, wherein the converter further comprises an active switch, wherein when the converter is in a closed mode, the active switch is closed, the first diode is reverse-biased, the second current flows from the primary winding side of the first transformer toward the first equivalent capacitor combination and the power energy provided by the power source is stored in the converter.

13. The system as claimed in claim 11, wherein the converter further comprises an active switch, wherein when the converter is in an opened mode, the active switch is opened, the first diode is forward-biased, the second current flows from the first equivalent capacitor combination toward the primary winding side of the first transformer and the power energy stored in the converter is outputted.

14. The system as claimed in claim 9, wherein the first equivalent capacitor combination, the primary winding side of the first transformer and the primary winding side of the second transformer form a first serial circuit which is coupled with an output end of the converter having one of an input end, the output end, an intermediate capacitor, an active switch and a second diode, the secondary winding side of the first transformer and the first diode form a second serial circuit which is coupled with one of the input end and one of both input or output ends of an additional serial circuit comprising the intermediate capacitor and the active switch, and the secondary winding side of the second transformer and the second equivalent capacitor form a third serial circuit which is coupled with one of both ends of the second diode.

15. The system as claimed in claim 14, wherein the converter provides an output current, the current flowing through the primary winding side of the first transformer is a second current, the current flowing out of the converter is a third current, wherein the second current and the third current respectively have waveform phases opposite to each other so as to synthesize the first current, which is a direct current.

* * * * *